(12) United States Patent
Fielding et al.

(10) Patent No.: US 10,388,057 B2
(45) Date of Patent: Aug. 20, 2019

(54) GRAPHICS PROCESSING SYSTEMS WITH EFFICIENT YUV FORMAT TEXTURING

(71) Applicant: Arm Limited, Cambridge (GB)

(72) Inventors: Edvard Fielding, Trondheim (NO); Jorn Nystad, Trondheim (NO); Andreas Due Engh-Halstvedt, Trondheim (NO)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/029,619

(22) Filed: Jul. 8, 2018

(65) Prior Publication Data

US 2019/0019323 A1    Jan. 17, 2019

(30) Foreign Application Priority Data

Jul. 13, 2017 (GB) .................................. 1711269.9

(51) Int. Cl.
*G09G 5/02* (2006.01)
*G09G 5/393* (2006.01)
*G06T 15/04* (2011.01)
*G06T 15/00* (2011.01)
*G06T 3/40* (2006.01)
(Continued)

(52) U.S. Cl.
CPC .............. *G06T 15/005* (2013.01); *G06T 1/20* (2013.01); *G06T 1/60* (2013.01); *G06T 3/4007* (2013.01); *G06T 15/04* (2013.01); *G09G 5/02* (2013.01); *G09G 5/393* (2013.01)

(58) Field of Classification Search
None
See application file for complete search history.

(56) References Cited

U.S. PATENT DOCUMENTS 6,181,350 B1 * 1/2001 Corona ................. G06T 3/4007
345/428
6,483,516 B1    11/2002 Tischler
(Continued)

FOREIGN PATENT DOCUMENTS

CN       103077129       5/2013
CN       103077130       5/2013

OTHER PUBLICATIONS

GB Combined Search and Examination Report dated Jan. 11, 2018, GB Patent Application No. GB1711269.9.
(Continued)

*Primary Examiner* — Joni Richer
(74) *Attorney, Agent, or Firm* — Vierra Magen Marcus LLP

(57) ABSTRACT

In a graphics processing system, when using a graphics texture that is stored in memory as YUV texture data, the YUV texture data is stored in the texture cache from which it is to be read when generating a render output such that the data values for a chrominance data element and its associated set of one or more luminance data elements of the texture are stored together as a group in the cache. The group of data in the cache is tagged with an identifier for the data values of the chrominance data element and its associated set of one or more luminance data elements that is useable to identify the chrominance data element and its associated set of one or more luminance data elements in the cache, and that is indicative of a position in the YUV graphics texture.

21 Claims, 12 Drawing Sheets

(51) Int. Cl.
*G06T 1/20* (2006.01)
*G06T 1/60* (2006.01)

(56) References Cited

U.S. PATENT DOCUMENTS

| | | | |
|---|---|---|---|
| 6,518,974 B2 * | 2/2003 | Taylor | G09G 5/02 |
| | | | 345/582 |
| 6,650,333 B1 | 11/2003 | Baldwin | |
| 7,171,051 B1 * | 1/2007 | Moreton | G06T 9/00 |
| | | | 382/165 |
| 7,710,425 B1 | 5/2010 | Baldwin | |
| 8,271,734 B1 | 9/2012 | Glasco | |
| 8,411,753 B2 * | 4/2013 | Cha | H04N 19/34 |
| | | | 375/240.01 |
| 8,447,948 B1 | 5/2013 | Erdogan | |
| 2003/0151610 A1 * | 8/2003 | Kuriakin | G09G 5/42 |
| | | | 345/589 |
| 2009/0160857 A1 | 6/2009 | Rasmusson | |
| 2010/0161904 A1 | 6/2010 | Cypher | |
| 2011/0074802 A1 | 3/2011 | Nickolls | |
| 2014/0122809 A1 * | 5/2014 | Robertson | G06F 12/084 |
| | | | 711/141 |
| 2014/0140401 A1 * | 5/2014 | Lee | H04N 19/593 |
| | | | 375/240.12 |
| 2014/0156948 A1 | 6/2014 | Roberts | |
| 2015/0169459 A1 | 6/2015 | Huang | |
| 2015/0178214 A1 | 6/2015 | Alameldeen | |
| 2016/0048980 A1 | 2/2016 | Wang | |
| 2017/0256024 A1 | 9/2017 | Abraham | |
| 2017/0262373 A1 | 9/2017 | Bedi | |
| 2017/0286302 A1 | 10/2017 | Roy | |
| 2017/0295379 A1 * | 10/2017 | Sun | H04N 19/44 |
| 2018/0089091 A1 | 3/2018 | Akenine-Moller | |

OTHER PUBLICATIONS

Fielding, et al., "Cache Arrangement for Graphics Processing Systems," U.S. Appl. No. 15/714,037, filed Sep. 25, 2017.

Office Action dated Jan. 11, 2019, U.S. Appl. No. 15/714,037.

Zhang et al, Enabling Partial Cache Line Prefetching Through Data Compression, URL: www.cs.ucr.edu/~gupta/research/Publications/Comp/icpp03.pdf (Year: 2003), Oct. 2003.

* cited by examiner

| Byte offset | 0 | 1 | 2 | 3 | 4 | 5 | 6 | 7 |
|---|---|---|---|---|---|---|---|---|
| Address: luma_stride*0 | Y00 | Y01 | Y02 | Y03 | Y04 | Y05 | Y06 | Y07 |
| Address: luma_stride*1 | Y10 | Y11 | Y12 | Y13 | Y14 | Y15 | Y16 | Y17 |
| Address: luma_stride*2 | Y20 | Y21 | Y22 | Y23 | Y24 | Y25 | Y26 | Y27 |
| Address: luma_stride*3 | Y30 | Y31 | Y32 | Y33 | Y34 | Y35 | Y36 | Y37 |

FIG. 13

| Byte offset | 0 | 1 | 2 | 3 | 4 | 5 | 6 | 7 |
|---|---|---|---|---|---|---|---|---|
| Address: chroma_stride*0 | U00 | V00 | U01 | V01 | U02 | V02 | U03 | V03 |
| Address: chroma_stride*1 | U10 | V10 | U11 | V11 | U12 | V12 | U13 | V13 |

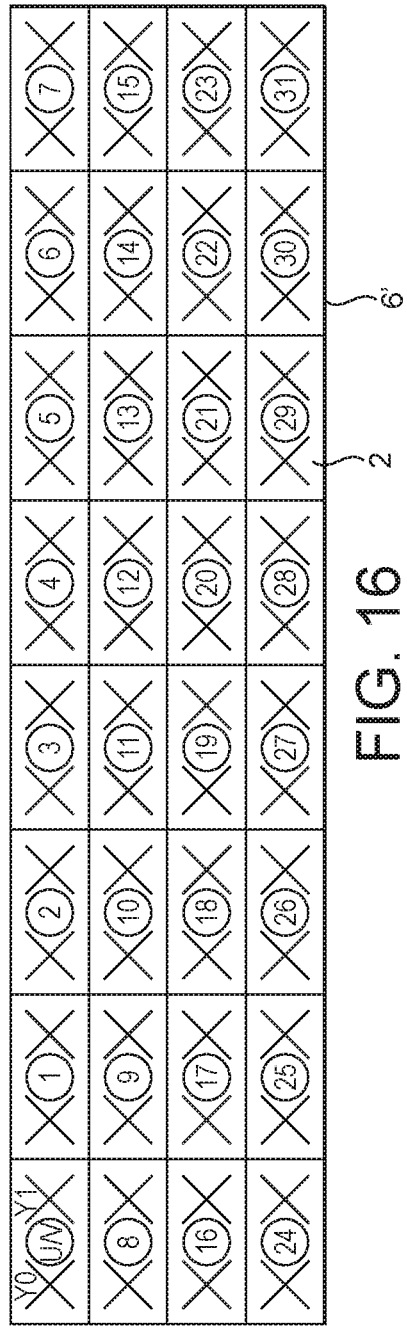

FIG. 20

GRAPHICS PROCESSING SYSTEMS WITH EFFICIENT YUV FORMAT TEXTURING

The technology described herein relates to a method of and an apparatus for storing data in a cache in a graphics processing system, particularly a method of and an apparatus for storing texture data in a cache in a graphics processing system.

It is common in graphics processing systems to generate colours for sampling positions in a render output (e.g. image to be displayed) being generated by applying so-called textures or texture data to the surfaces to be drawn. Such textures are typically applied by storing an array of texture elements or "texels", each representing given texture data (such as colour, luminance and/or light/shadow, etc. values), and then mapping the texels onto the corresponding elements, such as (and, indeed, typically) a set of sampling positions, for the render output in question (e.g. image to be displayed).

Thus a graphics texture will typically be configured as an array of data elements (texture elements (texels)), each having a corresponding set of texture data stored for it. The texture data for a given position within the texture is then determined by sampling the texture at that position (e.g. using a bilinear interpolation process).

Texture data may be provided as data in the "YUV" colour space. YUV colours are described by a "luma" (Y) value representing the luminance or brightness of the colour, and two "chroma" values (U and V) representing the chrominance information of the colour. YUV data is often used for video images and its use is becoming more common in graphics processing systems, e.g. with the increased use of digital TV and set-top boxes. Thus efficient processing of this type of data is becoming more important.

In the case of a "YUV" texture, for respective data elements within the texture, appropriate luma (Y) and chroma (U and V) values will be stored.

Where the luma and chroma data for a YUV texture are stored at the same resolution, for each data element in the texture there will be a respective luma (Y) value and two chroma (U and V) values. In other words, for each "chroma" data element in the texture, there will be a corresponding set of one luma data element.

The human eye is more sensitive to brightness than chrominance, so YUV data is usually compressed using a technique called "chroma sub-sampling". Chroma sub-sampling stores the chroma (U and V) information at a lower resolution than the luma (Y) information.

Where the chroma data is sub-sampled, the chroma data will accordingly be stored for and represented in the texture at a lower resolution than the luma data. Thus the array of data elements for which chroma data is stored will be at a lower resolution than the array of data elements for which the luma data is stored. The effect of this then will be that for each chroma data element (position), there will be a set of plural luma data elements (positions) for that chroma data element (i.e. the region in the texture that the chroma data element corresponds to will have a set of plural luma data elements, in effect, associated with it, as the luma data is stored at a higher resolution than the chroma data).

Thus, in general for YUV texture data, for each chroma data element (position (sample)) in a YUV texture, there will be a set of one or more associated luma data elements (positions (samples)), depending on whether and to what extent the chroma data is sub-sampled.

Three exemplary chroma sub-sampling modes are:
1. YUV444—luma and chroma data are stored at the same resolution (there is no chroma sub-sampling); in this case each chroma data element (sample) will have one luma data element (sample) associated with it.
2. YUV422—chroma data is stored at half the resolution of luma data horizontally but at the same resolution as luma data vertically; in this case each chroma data element (sample) will have two luma data elements (samples) associated with it.
3. YUV420—chroma data is stored at half the resolution of luma data both horizontally and vertically; in this case each chroma data element (sample) will have four luma data elements (samples) associated with it.

FIG. 1 shows an example array (or part of a larger array) of chroma and luma data elements for the YUV420 sub-sampling mode. In this figure (and in further such figures), the circles indicate the positions for chroma data elements 40 and the crosses indicate the positions for luma data elements 41. It can be seen that the chroma data is sampled at half the resolution of the luma data both horizontally and vertically. Thus, each chroma data element has four luma data elements associated with it.

YUV texture data, particularly chroma sub-sampled YUV data (e.g. in the YUV422 or YUV 420 mode), is commonly stored in memory as two or three separate data arrays (in a so-called "multi-plane" format), with one data array (plane) containing the luma (Y) information, and one or two other data arrays (planes) containing the chroma (U and V) information. Where one data array (plane) is provided for the chroma data, both the U and V chroma data are stored in the same array. Where two data arrays (planes) are provided for the chroma data, the U chroma data is stored in one array and the V chroma data is stored in the other.

When texture data is needed by a graphics processor (e.g. for rendering an image to be displayed), the texture data required for the rendering process is usually first fetched from the memory where it is stored and loaded into a cache (e.g. a texture cache) of or accessible to the graphics processor, with the graphics processor (the rendering pipeline implemented by the graphics processor) then reading the texture data from the cache for use.

The Applicants believe that there is scope for improvements to the handling of YUV texture data in graphics processing systems.

BRIEF DESCRIPTION OF THE DRAWINGS

Embodiments of the technology described herein will now be described by way of example only and with reference to the accompanying drawings, in which:

FIG. 13 shows how luma data is stored in memory according to an embodiment of the technology described herein;

FIG. 14 shows how chroma data is stored in memory according to an embodiment of the technology described herein;

FIG. 15 shows a cache line coordinate system according to an embodiment of the technology described herein;

FIG. 16 illustrates a region of a texture whose texture data is stored in one texture cache line, according to an embodiment of the technology described herein;

FIG. 17 shows an embodiment of how texture data from thirty two macrotexels is stored in a cache line, according to an embodiment of the technology described herein;

FIG. 20 illustrates a region of a texture whose texture data is stored in one texture cache line, according to an embodiment of the technology described herein.

Like numerals are used for like features in the drawings (where appropriate).

DETAILED DESCRIPTION

Figure 1:
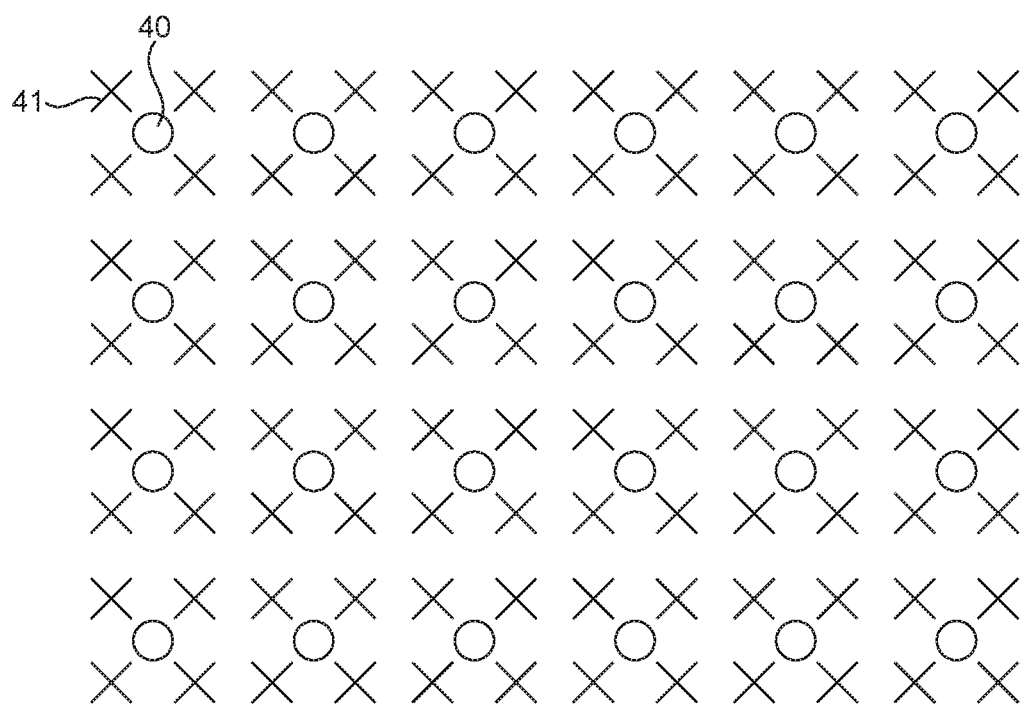
FIG. 1 shows an example array (or part of an array) of chroma and luma data sampling positions in a YUV texture.

A first embodiment of the technology described herein comprises a method of operating a graphics processing system in which graphics textures may be used when rendering a render output and in which data of a texture to be used when rendering a render output is loaded from memory into a cache for use by the graphics processing system when rendering the render output, the method comprising:
when using a graphics texture that is stored in memory as YUV texture data comprising luminance and chrominance texture data:
storing YUV texture data for the texture in a cache from which that texture data is to be read by the graphics processing system when generating a render output such that the data values for a chrominance data element and the associated set of one or more luminance data elements of the texture are stored together as a group in the cache; and
storing in association with the cache an identifier for the data values of the chrominance data element and its associated set of one or more luminance data elements, the identifier being useable to identify the chrominance data element and its associated set of one or more luminance data elements in the cache, and being indicative of a position in the graphics texture.

A second embodiment of the technology described herein comprises a graphics processing system comprising:
a memory;
a graphics processing unit; and
a cache; and
in which graphics textures may be used when rendering a render output and in which data of a texture to be used when rendering a render output is loaded from the memory into the cache for use by the graphics processing unit when rendering the render output;
the graphics processing system further comprising:
processing circuitry operable to, when using a graphics texture that is stored in the memory as YUV texture data comprising luminance and chrominance texture data:
store the YUV texture data for the texture in the cache such that the data values for a chrominance data element and the associated set of one or more luminance data elements of the texture are stored together as a group in the cache; and
store in association with the cache an identifier for the data values of the chrominance data element and its associated set of one or more luminance data elements, the identifier being useable to identify the chrominance data element and its associated set of one or more luminance data elements in the cache, and being indicative of a position in the graphics texture.

The technology described herein relates to the use (and in particular the caching) of graphics textures in the form of YUV texture data, i.e. data in the "YUV" colour space, as described above.

In the technology described herein, texture data for a YUV texture is stored in a cache for use when rendering a render output (such as an image (frame) to be displayed) such that (the data value for) a (and in an embodiment each) chrominance data element is stored in the cache together with (the data value(s) of) its associated set of one or more luminance data elements (the number of luminance data elements (values) depending, e.g., on the chroma subsampling mode used for the texture data) (rather than, e.g., storing the chrominance and luminance data values separately in the cache).

Furthermore, in the technology described herein, the set of the chrominance data element and its associated set of one or more luminance data elements is identified in the cache by means of an identifier that is indicative of a position in the graphics texture. The effect of this then is that, as will be discussed further below, the texture data in the cache can be accessed in (read from) the cache for use directly based on the texture position that is required (rather than, e.g., having to convert that position to appropriate memory addresses where the texture data may be stored).

As will be discussed further below, this all facilitates use of the YUV texture data (e.g. for rendering a render output), as the chrominance and luminance data values for a given texture position may be read together from the cache, based on (e.g. using) the texture position that is required (that is to be sampled) (in contrast, e.g., to having to read the luminance and chrominance data values separately from the cache, e.g. using memory addresses).

Indeed, the Applicants have found that by using the technology described herein, it can be possible to speed up processing throughput of YUV texture data by a factor of 2 (e.g. for 2-plane YUV formats) or 3 (e.g. for 3-plane YUV formats). This means that a single-core graphics processing unit (GPU) could be used to do the same job as a dual- or triple-core GPU. This can amount to a huge saving both in area and power. This is particularly useful in the cases of digital TV and set-top boxes, for example. When rendering at a 4K resolution for a digital TV at 60 Hz, around 500 million pixels must be read every second. If the system is running at 500 MHz, this means that a single-core GPU can be used instead of a 2- or 3-core GPU. Thus, a far more efficient GPU may be provided, particularly in the case of video, for a very small overhead per core.

The YUV texture that is being used may be any suitable and desired such texture. In an embodiment, it represents an image (a frame) to be displayed. In an embodiment it comprises a video frame to be displayed, e.g. from a sequence of video frames to be displayed.

The YUV texture may be configured according to any desired and suitable chroma sub-sampling mode. In an embodiment it is configured according to one of the three modes discussed above (thus YUV444, YUV422 or YUV420).

Thus, the chroma (U and V) data (of the YUV texture data) may be provided for the texture at a lower resolution than the luma (Y) data (of the YUV texture data), e.g. the chroma data (of the YUV texture data) may be sub-sampled. For example, in some cases, the chroma data may be stored at half the resolution of luma data horizontally but at the same resolution as luma data vertically. In other cases, the chroma data may be stored at half the resolution of luma data both horizontally and vertically.

Other chroma sub-sampling modes may also be used.

As discussed above, in the technology described herein, the texture data for the YUV texture is stored in the cache such that a chrominance data element (data value) and its associated set of one or more luminance data elements (values) are stored together in the cache.

As discussed above, the Applicants have recognised in this regard that for each chrominance data element (position) in a YUV texture, there will be a corresponding set of one or more luminance data elements (positions) (depending upon whether and which chroma sub-sampling mode is being used). In other words, the YUV texture can effectively be considered as being made up of a plurality of "macrotexels" ("macro data elements"), with each such macrotexel comprising one chrominance data element (one chroma sample) of the YUV texture and the set of associated one or more luminance data elements (luma samples) of the YUV texture (and having a respective position within the texture, e.g., in effect, corresponding to the position of the chrominance data element of the macrotexel in the texture).

For example, for a YUV444 texture, each "macrotexel" will comprise one chrominance data element (sample) and one luminance data element (luma sample). For a YUV422 texture, each macrotexel will comprise one chrominance data element and a pair of luminance data elements. For YUV420, each macrotexel will comprise one chrominance data element and four luminance data elements.

In the technology described herein the data values (the luminance and chrominance data values) for such a macrotexel are stored together as a group in the cache.

In other words, the YUV texture data is stored in the cache as a group of that data (as a "macrotexel"), the group (macrotexel) comprising the data values for a chroma sample and its associated one or more luma samples. For example, a chroma sample (data value) may have one, two or four luma samples (data values) associated with it.

This is in an embodiment done for all the data of the YUV texture data that is stored in the cache (i.e. whenever data of the YUV texture is stored in the cache).

Thus, the YUV texture data is in an embodiment stored in the cache as respective groups of that data ("macrotexels"), with each such group (macrotexel) comprising the data values for one chroma data element (sample) and its associated one or more luma data elements (samples).

Correspondingly, in an embodiment when a particular macrotexel of the YUV texture is required, that data is stored in the cache such that the chrominance data value and its associated set of one or more luminance data values for the macrotexel are stored together as a group in the cache, and then when a further YUV texture macrotexel is required, that further macrotexel is correspondingly stored in the cache such that the chrominance data value and its associated set of one or more luminance data values are stored together as a group in the cache.

The (and each) group (macrotexel) of YUV texture data that is stored in the cache will comprise the data value for one chroma data element (sample) and the data values for the associated one or more luma data elements (samples). The number of luma samples that are stored for a group (macrotexel) will depend upon the chroma sub-sampling mode that is used for the YUV texture.

For example, when the chroma and luma data are provided at the same resolution (i.e. there is no chroma sub-sampling), each group (macrotexel) should, and in an embodiment does, contain equal numbers of chroma and luma data values, e.g., and in an embodiment, one chroma data value and one luma data value.

When the chroma data is provided at a lower resolution than the luma data, each group should, and in an embodiment does, contain one chroma data value and plural (two or more) (e.g. four) luma data values.

More specifically, when the chroma data is provided at half the resolution of the luma data horizontally but at the same resolution as the luma data vertically, each group (macrotexel) should, and in an embodiment does, contain one chroma data value and two luma data values.

When the chroma data is stored at half the resolution of the luma data both horizontally and vertically, each group (macrotexel) should, and in an embodiment does, contain one chroma data value and four luma data values.

In alternative embodiments, and even in cases when the chroma data is stored at a lower resolution than the luma data in memory, each group (macrotexel) may contain equal numbers of chroma and luma data values, e.g. the single chroma data value (for each of U and V) for a given set of luma values may be replicated in the group to equal the number of luma data values.

Thus, although a group (macrotexel) of texture data stored in the cache in an embodiment contains a single chroma data value, a given chroma data value may be replicated, e.g. so that equal numbers of chroma and luma data values are stored in the cache.

This may be done when the system is to operate in a "replicated chroma" mode, for example.

In such cases, the texture data could be stored in groups (macrotexels) containing one (a single) chroma (one U and one V) data value and one (a single) corresponding luma data value (e.g. in contrast to macrotexels with multiple luma data values for a given chroma (U and V) value). Thus, in effect, with such a "replicated chroma" system, chroma sub-sampled texture data would be converted into YUV444 data with no sub-sampling (i.e. equal numbers of chroma and luma data values) during fetching of the cache line from memory.

The data values for a group (macrotexel) comprising a chrominance data element and its associated set of one or more luminance data elements may be stored together in the cache in any suitable and desired manner. In an embodiment, the data values are stored as a defined data unit, such as, and in an embodiment, as a respective data word, in the cache. Each respective group of data values (each "macrotexel") could, for example, and in an embodiment, be stored as a 64-bit data word in the cache.

In an embodiment a common data unit (e.g. data word) structure is used for each respective group of chrominance and luminance data values (for each macrotexel) that is stored in the cache. In an embodiment the data unit (e.g. data word) has respective fields for the data values, and each such data unit (data word) has the same order and configuration of those fields.

In one example, the data unit (e.g. data word) contains fields for the data values in the order of fields for the one or more luma data values and then fields for the chroma data values (U and V). Alternatively, fields containing (or for) the chroma data values (U and V) could be provided first in the data unit (e.g. data word) followed by fields containing (or for) the one or more luma data values, or fields containing (or for) the chroma data values (U and V) could be interleaved with fields containing (or for) the one or more luma data values. Other arrangements would, of course, be possible.

In an embodiment fixed-size data units (data words) are used, even if such a unit may be larger than is required for the data values. In an embodiment the data units (e.g. data words) are sized so as to be suitable for the cache and cache system (and memory system) of the graphics processing system.

In the case where the chroma and luma data for a particular group (macrotexel) do not fill the data unit (word), any unused bits in the data unit may be padded with "dummy" values, and/or used to encode other properties, such as transparency. This can help to ensure that the chroma and/or luma data are stored at consistent positions within each data unit (word), thereby facilitating reading of the cached texture data.

In an embodiment, the same amount of storage (e.g., the same number of bits) is used to store each luma and each chroma (e.g. U and V) data value in the cache. For example, in an embodiment, 10 bits may be used to store each luma data value and each chroma data value. Any unused bits are in an embodiment padded with dummy values (e.g. as described above).

For example, in the case where the chroma data is stored at half the resolution of the luma data both horizontally and vertically in the YUV texture, each group (macrotexel) could contain two chroma data values (one U and one V) and four luma data values. In the case where 10 bits are used to store each luma and each chroma data value, this would total 60 bits (10 bits for each of the four luma data values, and 10 bits for each of the two chroma (U and V) data values). If a 64 bit word is used to stored this data (e.g. in an embodiment), then this would lead to having 4 bits of the word left over, and in an embodiment being "padded" or filled with dummy values, or a transparency mask.

Corresponding arrangements are in an embodiment used for other chroma (sub-) sampling modes.

The cache should, and in an embodiment does, comprise one or more, and in an embodiment a plurality of, cache lines.

In an embodiment, a plurality of groups of YUV texture data (macrotexels) are stored in a (and in an embodiment in each) cache line (that is being used to store data from the YUV texture). Correspondingly, a (and each) cache line in an embodiment comprises a plurality of data units (data words), with each data unit containing the data for one group of texture data (macrotexel).

A cache line can store any suitable and desired number of groups of texture data (macrotexels). This may depend, for example, upon the size of each cache line and the size of the data units (data words) that are used to store each group of texture data (macrotexel). For example, in the case where each cache line contains 1024-bits, and 64-bit data words are used to store the data for a macrotexel, each cache line could, and in an embodiment does, contain up to (and in an embodiment does contain) 16 groups of texture data (macrotexels).

Thus, in an embodiment, each cache line may, and in an embodiment does, contain 16 groups of texture data (macrotexels).

In an embodiment, the plurality of groups of texture data (macrotexels) stored in a cache line comprise a set of contiguous macrotexels of the YUV texture (i.e. represent a set of adjacent (or successive) chroma data element positions of the texture (and their corresponding luma data element positions).

In other words, the plurality of groups of texture data (macrotexels) stored in a cache line in an embodiment comprises a set of macrotexels that cover a particular region (area) of the YUV texture (and thus a set of chroma data element positions of the texture (and their corresponding luma data element positions) for a particular region (area) of the YUV texture).

The set of contiguous macrotexels that is stored in the cache line can have any suitable and desired configuration of macrotexels. In an embodiment, the set of contiguous macrotexels is rectangular, including square. For example, a cache line can store a row or column of macrotexels that is one macrotexel high or wide, respectively.

In an embodiment, a cache line is used to store a set of contiguous macrotexels that is two rows (or two columns) of macrotexels high (or wide) (with the number of macrotexels in the rows or columns then being determined by the overall capacity of the cache line). In another embodiment, a cache line stores a square set of contiguous macrotexels.

Thus, in the case where each cache line contains 16 groups of texture data (macrotexels), those 16 groups (macrotexels) in an embodiment comprise an 8×2, 2×8 or 4×4 set of such groups (macrotexels) from the YUV texture.

The groups of texture data (macrotexels) may be stored in a cache line in any suitable and desired order. In an embodiment, they are stored in the cache line in a particular, in an embodiment selected, in an embodiment predefined order, e.g., and in an embodiment, with respect to the set of contiguous macrotexels of the texture that they correspond to. This will then facilitate identifying respective groups of texture data (macrotexels) within a cache line, e.g., from knowing the position of one of the groups of texture data in the cache line.

In an embodiment, the plurality of groups of texture data (or macrotexels) are stored in the cache line in an order in which they correspond to the image to be processed, e.g. in Morton (Z) order, raster order, etc.

By arranging and storing the texture data in the cache in this way, this can facilitate later processing of the texture data for a particular area or sample position of the texture as all of the texture data for an area of the texture is stored together in a cache line.

In the technology described herein, an identifier (a "lookup" key) for identifying a group of texture data (macrotexel) stored in the cache is also stored in association with (and in an embodiment in) the cache for use to identify the group of texture data (the macrotexel) in the cache (i.e. that can be and in an embodiment is to be used to read the texture data from the cache).

The identifier can be provided in any suitable and desired way. In an embodiment, the identifier is provided as a tag to the cache line in question (in which the group of texture data (macrotexel) is stored).

The identifier is indicative of a position in the YUV texture (in contrast to, e.g., comprising a memory address where the data is stored).

The position in the texture that is used as an identifier for a group of texture data (a macrotexel) can be any suitable and desired position in the texture. In an embodiment, the identifier is indicative of the position in the graphics texture of a (and the) chrominance data element and its associated set of one or more luminance data elements (of a (the) macrotexel).

The position need not be the position of the group of texture data (macrotexel) in question (and, indeed, in an embodiment typically will not be, as will be discussed further below), but should be a position from which the position of the group of texture data (macrotexel) in question in the YUV texture can be determined.

In one embodiment, the identifier is indicative of the position of a chrominance data element (value) in the texture. Since each group of texture data (macrotexel) will contain a single chroma data element (position) (but may contain multiple luma data elements (positions)), by storing an identifier indicative of the position of a chroma data element in the cache, this can help to facilitate determining which texture data should be read for texturing a particular sample position of an e.g. image to be rendered.

In an embodiment, the identifier is indicative of a region within the texture (that the chrominance data element and its associated set of one or more luminance data elements (that the macrotexel) falls within).

While it would be possible to provide a separate identifier for each group of texture data (macrotexel), in an embodiment, a single (one) identifier (tag) is provided and used for more than one group of texture data (macrotexels). In an embodiment, a single "position" identifier (tag) is provided and used for a given cache line (and thus used in common for the plurality of groups of texture data (macrotexels) stored in the cache line).

In an such embodiment, where a single "position" identifier (tag) is provided and used for a given cache line, the single "position" identifier (tag) that is provided and used for a given cache line is indicative of the position of the plural groups of texture data (macrotexels) (the set of contiguous macrotexels) that is stored in the cache line in question.

In an such arrangement, the overall texture is considered to be divided into respective regions (chunks). Each such region is in an embodiment the same size and shape (configuration), and in an embodiment contains the same number (and layout) of macrotexels. Each region in an embodiment corresponds to a given group of macrotexels (block of macrotexels) that will be stored in (that will fill) a cache line.

In this case, the respective regions (chunks) that the texture is divided into are in an embodiment indexed across the texture, and the position identifier (tag) used for a given cache line is then set to the index position (coordinates) of the texture data region within the texture that the plural macrotexels (set of macrotexels) that are stored in the cache line corresponds to. The position identifier (e.g. cache line tag) in an embodiment thus indicates one of the texture regions (chunks).

Thus, in an embodiment, the texture that is being stored in the cache is divided into a plurality of regions (chunks), each region corresponding to a set of plural macrotexels that will be stored in a single cache line, and the position identifiers (tags) that are used for the cache lines in the texture cache are indicative of the relative position within the texture of the texture region (chunk) that the set of macrotexels stored in the cache line corresponds to.

Other arrangements would, of course, be possible.

For example, the identifier (tag) for a cache line could (and in an embodiment does) indicate the position of a, in an embodiment chroma, data element of one of the texture data groups (macrotexels) stored in the cache line. For example, the identifier for a cache line may, and in an embodiment does, indicate the position of the chroma data element in the first texture data group (macrotexel) stored in the cache line.

In such embodiments, the identifier for a cache line in an embodiment indicates the position of a data element (and in an embodiment of the chroma data element) of a particular, in an embodiment selected, and in an embodiment predefined, one of the groups of texture data (macrotexels) of the set of plural contiguous macrotexels that are stored in a cache line. For example, the identifier for a cache line could indicate the position of a data element (and in an embodiment of the chroma data element) of the first group of texture data (macrotexel) stored in the cache line.

In an such embodiment, the identifier for a cache line indicates the position of a, and in an embodiment of the chroma, data element of the top left macrotexel of the contiguous set (array) of macrotexels stored in the cache line. However, in alternative embodiments, the identifier could indicate the position of a different, e.g. chroma, data element stored in the cache line.

The identifier indicative of position in the YUV texture can be configured in any suitable and desired form. Thus it could, for example, comprise an "absolute" position in the YUV texture. However, in an embodiment, the identifier indicates the position as a position index, e.g., and in an embodiment, as discussed above by indicating the (relative) position index (coordinates) (x and y indices) of the set of macrotexels stored in the cache line. Alternatively, the identifier may indicate the position as a position index, e.g., and in an embodiment, by indicating the index of the e.g. chroma, data element in question that the position corresponds to.

In the former case, the position index could indicate the position of the region (set of macrotexels) in the texture, with the index (0,0) (e.g.) indicating the top left region (chunk), (1,0) indicating the next region (chunk) along horizontally, and (0,1) indicating the next region (chunk) below that at (0,0). Thus, the indices would run from (0,0) to (x−1, y−1), where x is the number of texture regions (chunks) horizontally and y is the number of texture regions (chunks) vertically, and the index (x−1, y−1) would indicate the bottom right region (chunk) in the texture.

Correspondingly, in the latter case the position index could indicate the position of the, e.g. chroma, data element in the array of data elements in the texture, with the index (0,0) indicating the top left (chroma) data element, (1,0) indicating the next (chroma) data element along horizontally, and (0,1) indicating the next (chroma) data element below that at (0,0). Thus, the indices would run from (0,0) to (x−1, y−1), where x is the number of (chroma) data elements horizontally and y is the number of (chroma) data elements vertically, and the index (x−1, y−1) would indicate the bottom right (chroma) data element in the texture.

The YUV texture will be stored in a memory of the data processing system that the graphics processing system is part of. The memory where the YUV texture is stored may be any suitable and desired memory of the overall data processing system, such as, and in an embodiment, a main memory for the graphics processing system (e.g. where there is a separate memory system for the graphics processor), or a main memory of the data processing system that is shared with other elements, such as a host processor (CPU), of the data processing system. Other arrangements would, of course, be possible.

The data of the YUV texture will accordingly need to be fetched from the memory where it is stored and loaded into the cache (in the arrangement of the technology described herein).

Thus, in an embodiment, the technology described herein further comprises (and the graphics processing system is further configured to) fetching data of the YUV texture from memory and storing it in the cache in the required manner.

The storing of the texture data in the cache in the required manner when it is fetched from the memory where the YUV texture is stored can be performed in any suitable and desired manner. This may, and in an embodiment does, depend upon the format in which the data for the YUV texture is stored in the memory.

For example, where the data for the YUV texture is stored in the memory such that data values for a chrominance data element (position) and its associated set of one or more luminance data elements (positions) are already stored together, then it may be the case that the data can be read from the memory in the layout in which it is stored and stored directly in the cache (and in that case, that is in an embodiment what is done).

On the other hand, as discussed above the data for the YUV texture may be stored separately in the memory, e.g. as separate data arrays in the memory. This will be the case where the texture data is stored in a multi-plane format (as discussed above). In such cases therefore, the texture data will not be stored in the appropriate groups (macrotexels) in the memory, and so will need arranging into the appropriate groups (macrotexels) as it is being (or before it is) stored into the cache.

In this case therefore the texture data will be stored in the cache in a different arrangement (format) to the arrangement that it is stored in the memory. Accordingly, the process of fetching the data from memory and storing it in the cache should, and in an embodiment does, operate to rearrange the data from the arrangement that it was stored in memory to the desired arrangement in the cache.

Thus, in an embodiment, the operation of storing the texture data into the cache is operable to group the data values for data positions in the YUV texture, so as to store the data values for respective groups of a chrominance data element (position) and its associated set of one or more luminance data elements (positions) together in the cache (in adjacent data positions (fields) in the cache, and in an embodiment together in the same common defined data unit (data word) in the cache).

Thus, the chrominance and luminance data values for a particular group (macrotexel) of texture data are read from memory and stored in consecutive data positions (data fields) in the cache, such that the chrominance and luminance data values for a particular group (macrotexel) of texture data are stored together, even if they are read from memory separately.

Thus, in an embodiment, the method of the technology described herein comprises (and the graphics processing system is correspondingly configured to), in the case where the YUV texture is stored as one or more separate arrays of chrominance data elements and a separate array of luminance data elements, to read the data value(s) for the chrominance data element(s) and the data values for the set of luminance data elements that correspond to that chrominance data element in the texture separately, but to then store those data values together (e.g. in a data unit (data word)) in a line of the cache.

For example, in the method, a chrominance data value (e.g. U or V or both) (e.g. for a group (macrotexel) of texture data) may be fetched from the memory and stored in the cache in an appropriate (determined) data position. The other chrominance data value (e.g. V or U, if the U and V chrominance data values are stored separately in the cache, e.g. in separate data arrays (planes)) may be fetched from the memory and stored in the cache in an appropriate (determined) data position. The associated luminance data value or values may be fetched from the memory and stored in the cache in an appropriate (determined) data position (or appropriate determined data positions). The chrominance and luminance data values may be fetched from the memory and stored in the cache (in their appropriate data positions) in any order in time.

The chrominance and associated luminance data values may be fetched from the memory and written directly into the cache (in their appropriate data positions). In this case therefore the chrominance and associated luminance data values will be grouped together into their respective groups (macrotexels) as (when) the luminance and chrominance data values are stored in the cache (in the case where those data values are arranged separately in the memory (e.g. in a multiplane arrangement).

In order to facilitate this operation (and otherwise), the cache is in an embodiment configured so as to be addressable at a suitable level of data subdivision. For example, the cache may be addressed at the level of a single bit or a single byte. In an embodiment, the cache is addressable in units of four bits.

This may be achieved, for example, by utilising bit-strobes for the memory writes. For example, bit-enables may be set for the luma data positions only in a cache line when writing luma data in the cache line (and vice-versa).

In other embodiments, the chrominance and luminance data values may not be stored directly in the cache after being fetched from memory, but may first be stored in some form of intermediate storage, such as a buffer. In this case therefore, the chrominance and luminance data values fetched from memory would be first be stored in the intermediate storage, e.g. buffer, and then written from that intermediate storage (buffer) into the cache. In this case, the arrangement of the chrominance and luminance data values into their respective groups (macrotexels) may be performed when the values are written into the intermediate storage (buffer), such that they will be stored in the buffer in their respective groups, with the respective groups of chrominance and luminance data values (macrotexels) then being written, e.g., as a group (as a whole data word), into the cache at the appropriate position in a cache line of the cache.

Storing the chrominance and luminance data values fetched from memory in intermediate storage, such as a buffer, before they are stored in the cache, may facilitate the rearranging (grouping) of the chrominance and luminance data values into groups (macrotexels) before storing that data in groups (macrotexels) in the cache.

Regardless of the order in time, and whether or not a buffer is used, once the chrominance and associated luminance data values (e.g. for a group (macrotexel) of texture data) have all been fetched from the memory and stored in the cache, the end result should be, and is in an embodiment, that they are stored in the cache in groups (e.g. consecutive data positions in a cache lines), each group comprising a chrominance and associated luminance data values (e.g. for a group (macrotexel) of texture data).

As discussed above, a plurality of groups of texture data (macrotexels), e.g., and in an embodiment, corresponding to a set of contiguous macrotexels of the YUV texture, are in an embodiment stored in a cache line in a particular, in an embodiment selected, in an embodiment predefined order.

Thus, the method in an embodiment comprises (and the system is in an embodiment configured to) determining a data position in a cache line based on the (relative) position within the texture of the group of texture data (macrotexel) that the data element belongs to, for a texture data element value, and then storing the texture data element value in that data position in the cache line.

The position of the group of texture data (macrotexel) on which the data position in the cache line is based is in an embodiment the relative position of the group of texture data (macrotexel) in a set of contiguous macrotexels of the YUV texture that is being stored in the cache line in question.

As discussed above, in an embodiment the data position(s) is(are) determined such that groups of texture data (macrotexels) fetched from memory are stored in the cache line in an order corresponding to an order in which they are arranged in a set of, in an embodiment contiguous, macrotexels of the YUV texture.

As described above, the data unit (e.g. data word) in the cache line used to store the texture data should contain fields for the texture data (e.g. luma and chroma data). Thus, the method in an embodiment comprises (and the system is in an embodiment configured to) determining in which fields within a data unit to store the luma and chroma data from the fetched group of texture data (macrotexel).

Each group of texture data (macrotexel), e.g. from a set of contiguous macrotexels of the YUV texture to be fetched, may be separately or individually fetched from memory. For example, the groups of texture data (macrotexels), e.g. from a set of contiguous macrotexels of the YUV texture to be fetched, could be fetched from memory in any order. Thus, the data positions in the cache line in which a group of texture data (macrotexel) fetched from memory is to be saved is in an embodiment determined separately for each group of texture data (macrotexel), e.g. as it is fetched from memory.

The groups of texture data (macrotexels) may in an embodiment be fetched from memory in any order. They may in an embodiment also be stored in the cache line in any order in time (but in an embodiment in their determined data positions, e.g. based on the position of each group of texture data (macrotexel) fetched from memory in the set of contiguous macrotexels of the YUV texture being fetched). Thus, data units (e.g. data words) in a cache line may in an embodiment be filled in any order.

Such "rearranging" of texture data when loading it into the texture cache is viewed as being independently inventive and so, a further embodiment comprises a method of operating a graphics processing system in which graphics textures may be used when rendering a render output and in which data of a texture to be used when rendering a render output is loaded from memory into a cache for use by the graphics processing system when rendering the render output, the method comprising:

when using a graphics texture that is stored in memory as YUV texture data, the YUV texture data comprising a data array storing luminance data of the texture, and one or more other data arrays storing chrominance data of the texture:

reading a chrominance data value or values for a chrominance data element from the one or more other data arrays in which the chrominance data of the YUV texture is stored in the memory;

reading one or more luminance data values for a set of luminance data elements associated with the chrominance data element whose value has been read, from the data array in which the luminance data of the YUV texture is stored in the memory; and storing the read chrominance data value or values and luminance data values in the cache such that the data values for the chrominance data element and the associated set of one or more luminance data elements are stored together as a group in the cache.

A further embodiment of the technology described herein comprises a graphics processing system comprising:

a memory;

a graphics processing unit; and a cache; and in which graphics textures may be used when rendering a render output and in which data of a texture to be used when rendering a render output is loaded from the memory into the cache for use by the graphics processing unit when rendering the render output;

the graphics processing system further comprising:

processing circuitry operable to, when using a graphics texture that is stored in memory as YUV texture data, the YUV texture data comprising a data array storing luminance data of the texture, and one or more other data arrays storing chrominance data of the texture:

read a chrominance data value or values for a chrominance data element from the one or more other data arrays in which the chrominance data of the YUV texture is stored in the memory;

read one or more luminance data values for a set of luminance data elements associated with the chrominance data element whose value has been read, from the data array in which the luminance data of the YUV texture is stored in the memory; and store the read chrominance data value or values and luminance data values in the cache such that the data values for the chrominance data element and the associated set of one or more luminance data elements are stored together as a group in the cache.

Thus, in these embodiments of the technology described herein, YUV texture data is read from two or more data arrays (e.g. for chrominance and luminance texture data, respectively) in which it is stored in a memory, e.g. in a multi-plane format, but the YUV texture data is then rearranged into groups, each group comprising a chrominance data value and its associated set of one or more luminance data values, when stored in the cache.

Thus, for example, a chrominance data value will be read from the data array storing the chrominance data elements and stored in a data position in the cache, followed by reading one or more luminance data values from the luminance data array, and storing those luminance data values in data positions in the cache adjacent to (consecutive with) the data position that the chrominance data value was stored in (or vice-versa, i.e. reading and storing the luminance data values first followed by the chrominance data value(s)).

As described above, by rearranging and storing the YUV texture data in the cache in such groups, this can mean that the cache needs to be read fewer times to read the required texture data for an image to be processed (compared, for example, to cases where the YUV texture data is not stored in a cache in such groups, for example if storing the chrominance and luminance texture data in separate lines and/or data words in the cache), as both the chrominance and the luminance data samples for a given area (e.g. macrotexel) of the texture are stored (and accessible) together in the cache.

As will be appreciated by those skilled in the art, these embodiments of the technology described herein can include any one or more or all of the features of the technology described herein, as appropriate.

Thus, for example, the read chrominance data value(s) and associated set of one or more luminance data values are in an embodiment stored in successive data fields in a line of the cache, in an embodiment belonging to a given (and identifiable) data word in the cache. Equally, the chrominance value(s) and associated set of one or more luminance data values may be, in effect, written from memory directly into the cache so as to group them together (e.g. in one of the manners discussed above), or the arrangement of the data values into a group may be performed via an intermediate buffer from where the data values are then written into the cache.

As described in more detail above, the texture data in an embodiment may be stored in the cache in any order in time, so long as the end result is that the texture data is stored in the cache in groups, each group comprising a chrominance data value and its associated set of one or more luminance data values.

In an embodiment, this method also comprises storing in the cache an identifier for the data values of the chrominance data element and its associated set of one or more luminance data elements, the identifier being useable to identify the chrominance data element and its associated set of one or more luminance data elements in the cache, and being indicative of a position in the graphics texture (e.g. as described above).

These embodiments of the technology described herein may comprise any of the other features described above or below.

In any embodiment of the technology described herein, and as described above, the chroma data values may be replicated when storing the data in the cache such that, in cases when the chroma data is stored at a lower resolution than the luma data in memory, each group (macrotexel) in the cache contains a single chroma data value (for each of U and V) and a single luma data value. In such cases, when a chroma data value is fetched from the memory, it may be stored in the cache in more than one position (i.e. it is replicated), e.g., and in an embodiment, depending on the chroma sub-sampling mode used. In such cases, in an embodiment each chroma data value is stored at one data position in the cache line for each luma data value to which it will be associated. For example, in the YUV422 mode, each chroma data value would be stored twice in the cache, once for each luma data value associated with it. Alternatively, in the YUV420 mode, each chroma data value would be stored four times in the cache, again, once for each luma data value associated with it.

Alternatively, and if replication of chroma is desired, the chroma data values may be replicated when reading out the data from the cache.

In order to fetch the data into the cache, the data processing system will need to send appropriate memory requests to the memory for the texture data. These requests may be, and are in an embodiment, triggered by the graphics processor attempting to read texture data from the cache, or checking whether required texture data is stored in the cache, and then finding that that texture data is not present in the cache (i.e. encountering a cache miss). A request is in an embodiment then sent to the memory to fetch the "missing" data, and in an embodiment to fetch plural groups of texture data (e.g. corresponding to a region of the texture) (e.g. for, or sufficient to fill, a cache line) that includes the desired "missing" texture data.

In the technology described herein, and as will be discussed further below, the graphics processor will address the cache for the texture data using the appropriate texture position (as the texture data is identified in the cache using a texture position). However, in order to fetch the data from memory into the cache, the texture position that is used to address the cache will need to be converted to the appropriate memory addresses where the texture data for that texture position is stored in memory.

Thus, the method in an embodiment comprises (and the graphics processing system is further configured to), for a texture position for which texture data is required (to be sampled), (and for which texture is determined to not already be stored in the cache), converting that texture position into one or more memory addresses for addressing a memory in which texture data including texture data for that texture position is stored.

For example, and in some cases, the texture position may be converted into a single memory address, e.g. where all of the texture data (e.g. both chrominance and luminance texture data) for a texture position is stored together in the memory. All of the required texture data may be stored at the single memory address or, alternatively, the texture data may be stored in a number of memory addresses, the other memory addresses being determinable from the single memory address to which the texture position was converted (e.g. the required texture data could be stored in a set of, e.g. a series of consecutive, memory address where only one of these, e.g. a first, is needed in order to determine all of the memory addresses from which the required texture data is to be fetched).

In other cases, the texture position may be converted into two or more memory addresses, e.g. where the texture data required for each texture position (the texture position in question) is stored in two or more locations (memory positions) in the memory (e.g. in the case where the chrominance and luminance texture data are stored separately, e.g. in two or more data arrays, in the memory).

The conversion of a texture position to a memory address (or to two or more memory addresses) could be done in any suitable and desired manner. For example, and in an embodiment, it may be done by applying one or more predefined rules or formulae for such a conversion. Alternatively, it could be done by using a look-up table or other suitable means.

The texture position itself may be indicated in any desired way. For example, and in an embodiment, the texture position is indicated as a fractional position across the width and a fractional position across the height of the texture, for example by providing x and y coordinates in the range 0 to 1 or $-\frac{1}{2}$ to $+\frac{1}{2}$.

In some embodiments, the texture position is first converted to a position of a texture data element (e.g. a position index) in the YUV texture (e.g. a position of the closest texture data element in the YUV texture to that texture position) and then that position of a texture data element is converted to one or more memory addresses. This may be done separately for luma and chroma data elements, e.g. in cases where the chroma data is provided at a lower resolution than the luma data, and/or where the luma and chroma data are stored separately in memory. The conversion of a texture position to a position of a texture data element in the YUV texture is described in more detail below.

Thus, an x, y (e.g.) position index may be provided for each or both of the luma and chroma data elements to be sampled, for a given texture position. This position index is then in an embodiment converted into a memory address. The position index is in an embodiment converted to a memory address based on one or more of, and in an embodiment all of: a base address (the memory address of the first data element in the texture being sampled), the stride (the address-difference) between the start addresses of two consecutive scan-lines for the data-type (luma or chroma) in question, and a size (in an embodiment in bytes) occupied by a data value of the data-type (luma or chroma) in question, for the texture being sampled. For example, the position index may be converted to a memory address corresponding to a base address plus (the vertical index (y) multiplied by the stride) plus (the horizontal index (x) multiplied by the data value size).

Thus, in any of the embodiments of the technology described herein, and however the texture data is stored in the memory, the technology described herein in an embodiment comprises performing one or more memory requests to fetch required texture data from memory into the cache (a cache line). The number of memory requests may depend on how the texture data is stored in the memory, and, for example, the number of (different) locations at which it is stored. The number of memory requests may also (or alternatively) depend on the arrangement of groups of texture data to be stored in the cache or cache line.

In the case where the texture data is stored in the memory in a multi-plane format (or plural different data arrays), in an embodiment at least one (and in an embodiment only one) memory request is performed for each plane (array) of the texture.

For example, multi-plane texture data (e.g. in two or three planes) may be read with one pass (memory request) per plane, meaning that reading a two-plane texture may take two passes, and therefore two cycles per load, and reading a three-plane texture may take three passes and therefore three cycles per load.

In an embodiment, the texture data is fetched from the memory with one memory request for (or corresponding to) a (given) row of data in the texture. In this case, if the chroma data is sub-sampled, e.g. vertically, then there may be more requests for rows of luma data than for chroma data.

For example, in the case where 16 macrotexels (groups of texture data) are to be stored in a cache line from, e.g., an 8×2 (two rows of eight) block of macrotexels in the texture, and the texture data is provided in the YUV420 sub-sampling mode, each macrotexel will contain 2×2 luma data positions (values), and one chroma data position (value), so the 8×2 block of macrotexels will corresponds to 16×4 luma data values and 8×2 chroma data values. A cache line fetch from memory from a 3-plane YUV420 texture would therefore involve 8 memory requests: 4 for the four contiguous luma scans, 2 for the two lines of chroma in the U plane, and 2 for the two lines of chroma in the V plane.

When each memory request returns, which could, for example, be in any order (indeed, the operation in an embodiment supports "out of order" data fetching, or data fetching in any order), the data values are in an embodiment written into the cache line in an appropriate data position (e.g. in the appropriate bits) depending on their corresponding position in the texture. A memory request may include, e.g., an indication of one or more of: the cache line and position in the cache line where the data is to be stored, the format that the data is to be stored in the cache, etc., to facilitate this.

In an embodiment, a cache line is (only) indicated as being "valid" (i.e. that all of the requested texture data is stored in the cache line and therefore available for use) once all of the memory requests for the cache line have been returned. For example, the number of memory requests sent and returned may be tracked and/or recorded in order to determine when all of the memory requests have been returned. In an embodiment, this comprises using a reference count corresponding to the number of memory requests needed to fill the cache line.

Any suitable cache "filling" arrangement can be used to select the cache line or lines into which fetched texture data is stored, such as the least recently used cache line replacement arrangement, etc.

Once the texture data has been stored in the cache (in a cache line), it may be read from the cache (a cache line) for use in rendering a render output, such as an image to be displayed.

The texture data that is required will typically, and is in an embodiment, indicated by indicating a position in the YUV texture that is to be sampled (for which the texture data is required).

Correspondingly, in an embodiment, the graphics processor (e.g. the texture mapper of the graphics processor) addresses the cache storing the YUV texture data using a position for the texture that is indicative of the texture data that is required.

As described above, the position to be sampled in the YUV texture (the texture or sampling position) may be indicated as desired. In an embodiment it is indicated as a fractional position across the width and a fractional position across the height of the texture, for example by providing x and y coordinates in the range 0 to 1 or −½ to +½.

In an embodiment, the indicated sampling position is mapped to the position of a texture data element in the YUV texture (and in an embodiment to the position of a closest data element (e.g. one, and in an embodiment a top left, of four closest data elements to the sampling position) in the YUV texture), i.e. to a corresponding data element (texel) index in the YUV texture.

The YUV texture data element (texel) index may be derived as desired from the indicated sampling position. In an embodiment, the texel index is determined from the indicated sampling position and the width and height of the YUV texture defined in terms of the number of data positions across the width and height of the texture (respectively).

In an embodiment, the texture data element (texel) x and y indices (macrotexel_index_x and macrotexel_index_y, respectively, in the formulae below), corresponding to a texture position to be sampled are determined as:

$$\text{macrotexel\_index\_}x = \text{floor}(\text{sample\_position\_}x * \text{macrotexel\_horizontal\_count} - \text{chroma\_offset\_}x) \quad (1)$$

$$\text{macrotexel\_index\_}y = \text{floor}(\text{sample\_position\_}y * \text{macrotexel\_vertical\_count} - \text{chroma\_offset\_}y) \quad (2)$$

where: sample_position_x and sample_position_y, are the x and y coordinates of the position in the texture that is to be sampled, and are defined in the range from 0 to 1 (and thus accordingly give the fractional position of the sample position across the texture); and the "macrotexel_horizontal_count" and "macrotexel_vertical_count" variables correspond to the number of chroma data positions across the width and height of the texture, respectively. For YUV444, macrotexel_horizontal_count and macrotexel_vertical_count are the same as the width and height of the texture measured in texels, respectively. For YUV420 and YUV422, macrotexel_horizontal_count is equal to half of the width of the texture measured in texels. For YUV422 macrotexel_vertical_count is the same as the height of the texture measured in texels. For YUV420, macrotexel_vertical_count is equal to half of the height of the texture measured in texels.

In an embodiment, the texture has an even/constant width and height.

The chroma_offset_x and chroma_offset_y values correspond to the fractional horizontal and vertical positions, respectively, of the chroma sample within a macrotexel (referred to as the chroma "siting" within a macrotexel). This is described in more detail below.

The chroma_offset_x and chroma_offset_y values can be found from the following tables for different chroma sitings in chroma sub-sampling modes YUV444, YUV422 and YUV420, respectively:

| YUV444 | | | |
|---|---|---|---|
| Chroma siting X | Chroma siting Y | chroma_offset_x | chroma_offset_y |
| Co-sited | Co-sited | 0.50 | 0.50 |
| Centre | Co-sited | 0.50 | 0.50 |
| Co-sited | Centre | 0.50 | 0.50 |
| Centre | Centre | 0.50 | 0.50 |

| YUV422 | | | |
|---|---|---|---|
| Chroma siting X | Chroma siting Y | chroma_offset_x | chroma_offset_y |
| Co-sited | Co-sited | 0.25 | 0.50 |
| Centre | Co-sited | 0.50 | 0.50 |
| Co-sited | Centre | 0.25 | 0.50 |
| Centre | Centre | 0.50 | 0.50 |

| YUV420 | | | |
|---|---|---|---|
| Chroma siting X | Chroma siting Y | chroma_offset_x | chroma_offset_y |
| Co-sited | Co-sited | 0.25 | 0.25 |
| Centre | Co-sited | 0.50 | 0.25 |
| Co-sited | Centre | 0.25 | 0.50 |
| Centre | Centre | 0.50 | 0.50 |

In an embodiment the data position (index) of the chrominance data element that corresponds to (that is closest to or one of a number, e.g. four, closest to) the required sampling position is determined. Thus in this case therefore, the width and height of the texture (e.g. for use in the above formulae) will be defined in terms of the number of chrominance data positions (elements) (chroma texels) across the width and height of the texture.

As each group of texture data (macrotexel) stored in the cache will contain only a single chroma data position value (but potentially more than one luma data position value, depending on the chroma sub-sampling mode used, and whether or not the chroma data values have been replicated on storage into the cache), this then has the effect of straightforwardly identifying the group of texture data (the macrotexel) that the desired sampling position corresponds to. This then facilitates more straightforwardly identifying the required texture data in the cache, and reading all the chroma data and luma data that will be required for the sampling position from the cache simultaneously.

In an embodiment, the texel index (texture data position) determination also takes account of the relative position of a chrominance data position to its set of one or more associated luminance data positions.

The chroma and luma data may have various (relative) positions and/or arrangements within a group of texture data (macrotexel). These may depend on the chroma sub-sampling mode being used (e.g. how many luma data positions are associated with a single chroma data position). Different (relative) positions and/or arrangements could also be used for each chroma sub-sampling mode. However, in an embodiment, the same relative positions and arrangements of chroma and luma data positions within the groups of texture data (macrotexels) are used for a given texture (in its entirety).

In one embodiment (and where there is sub-sampling of the chroma data), the (single) chroma data position is located (in an embodiment, although not necessarily, centrally) between the associated luma data positions in the group of texture data (macrotexel). In this case, the luma data positions are in an embodiment distributed evenly around the chroma data position, e.g. on either side horizontally and/or vertically, and/or forming a square around the chroma data position with the chroma data position being in an embodiment at the centre of the square.

In an alternative embodiment, the (single) chroma data position may have the same position as one of the (or the single, if there is no chroma sub-sampling) luma data positions. For example, and in an embodiment, the chroma data position may have the same position as a left, or top left, luma data position in the group of texture data (macrotexel). Alternatively, the chroma data position may have the same position as a different (e.g. bottom left, right, top right or bottom right) luma data position in the group of texture data (macrotexel).

In an alternative embodiment, the chroma data value is replicated such that there are the same number of (e.g. two or four) chroma data positions as luma data positions. In this case, each chroma data position would have the same data value. The replicated chroma data values are in an embodiment provided at the same positions as the luma data positions.

Other positions and arrangements of the chroma and/or luma data positions are also possible.

The texel index (texture data position) determination in an embodiment takes account of the relative position of a chroma data element to its set of one or more associated luma data elements, e.g. by including a horizontal and/or vertical "offset" in the above formulae, depending on the relative position of the chroma data element in the group of texture data (macrotexel).

Once the texture element position (e.g. chrominance data element position) in the YUV texture has been determined, that determined position can then be and is in an embodiment used to read the corresponding data for the group of texture data stored in the cache for that determined texture data position (e.g. chrominance data position) (used to address the texture data cache to retrieve the texture data from the cache).

It would be possible in this regard simply to read and use a single group of texture data (macrotexel) to determine the data for a position to be sampled in the YUV texture. However, in an embodiment, the texturing process is operable to interpolate the values for a position in the YUV texture from the data values for plural defined texture data element positions in the YUV texture. In an embodiment, the data values for a position in the YUV texture are determined using bilinear interpolation of data values for texture data elements in the YUV texture.

Accordingly, in an embodiment, a set of 2×2 macrotexels in the YUV texture is identified and used to determine the data values for the position in that texture that is to be sampled. This could be done by determining respective texel indices for each macrotexel separately, e.g. in the manner discussed above.

However, in an embodiment, a single macrotexel position (index) is identified in the manner discussed above so as to identify the macrotexel position of one of the macrotexels in the 2×2 set of macrotexels that are to be used (and in an embodiment so as to identify the top-left macrotexel of the 2×2 macrotexel block), with the other (e.g. three) macrotexels of that 2×2 set then being identified (determined) accordingly.

Thus, in an embodiment, the indices of a texture data position (in an embodiment the chroma data position) close or closest to the sample position (e.g. top left) are determined, with the other (e.g. three other) texture data positions' (in an embodiment the chroma data positions) indices around or closest to the position being sampled then being determined based on the first determined texture data position (in an embodiment the chroma data position) indices, e.g. by adding or subtracting the relevant number of positions to the indices (e.g. by adding one in one and each axis direction).

The above expressions (1) and (2) specify the indices of the top left chroma data value of a 2×2 (macrotexel) block surrounding the sample position (where the chroma data value is located in the centre of the macrotexel). Alternative (e.g. appropriately modified) expressions could be used to specify a different one of four chroma data values surrounding the sample position, e.g. by replacing "−chroma_offset_x" and/or "−chroma_offset_y" with "+chroma_offset_x" and/or "+chroma_offset_y", respectively).

Once the indices of the texture data values (in an embodiment the, e.g. four, chroma data values) closest to the sample position have been determined, the groups of texture data values corresponding to those texture data values (e.g. groups of one chroma data value and its associated luma data values) are in an embodiment read from the cache.

As explained above, after or as the YUV texture data is loaded from memory and stored in the cache, an identifier for the data values of a chrominance data element and its associated set of one or more luminance data elements is also (in some cases in an embodiment) stored in the cache. Such an identifier is useable to identify the chrominance data element and its associated set of one or more luminance data elements in the cache, and is indicative of a position in the graphics texture.

This identifier (these identifiers) can thus be used to determine where in the cache (e.g. in which cache line and/or in which data units (words)) the texture data values required for the sample position in question (e.g. as determined above) are stored, and the required texture data values may then be read from the cache accordingly.

Once the data values from the (e.g. four) macrotexels (e.g. chroma data positions) to be used for a texture position to be sampled have been read from the cache, data values from those macrotexels are in an embodiment appropriately interpolated to determine the chroma and luma data values for the texture position being sampled. In an embodiment, the data values are interpolated using bilinear sampling (bilinear interpolation).

As each macrotexel will only have a single chroma data position (data value) associated with it, the chroma data value for the position being sampled can be, and is in an embodiment, determined by appropriate interpolation using the chroma data values for each macrotexel (e.g., and in an embodiment, the four chroma data values for the four macrotexels that have been identified).

However, as each macrotexel chroma data (position) may have more than one luma data value associated with it (e.g. in cases where the texture data is chroma sub-sampled, and each group of texture data (macrotexel) contains two or more (e.g. two or four) luma data values), rather than simply using all the luma values of all the macrotexels to determine the luma value for the position being sampled, a set of, e.g., and in an embodiment, four, luma data values to be used to determine the luma value for the texture position being sampled from the groups of texture data (macrotexels) for the sample position in question is in an embodiment determined.

Thus, in such cases, the technology described herein in an embodiment comprises determining which (e.g. four) luma data values from the groups of texture data values (macrotexels) are closest to the texture position being sampled, and then using (interpolating) those determined luma values to determine the luma value for the texture position being sampled.

Determining which (e.g. four) luma data values from the (e.g. four) groups of texture data values (macrotexels) are closest to the texture position being sampled could be done, for example, and in an embodiment, by inspecting the fractional index position (i.e. the fractional part of the sample index position) of the sample position and then, for example, following a rule(s) or formula(e) to determine which (e.g. four) luma data values are closest to the texture position being sampled. Depending on the location of the sample position, and the chroma sub-sampling mode being used, the (e.g. four) luma data values required could, for example, come from a single, two or four group(s) of texture data values (macrotexels) (e.g. depending on the chroma siting).

Once the subset of (e.g. four) luma data values from the groups of texture data values (macrotexels) closest to the texture position being sampled has been determined, those luma data values are in an embodiment interpolated (e.g., and in an embodiment, with bilinear interpolation) to determine a luma value for the texture sample position in question.

When interpolating data values for a YUV texture in the above manner, the interpolation weights for each of the four chroma (or luma) data elements surrounding the sample position to be determined (weight_top_left, weight_top_right, weight_bottom_left and weight_bottom_right) are in an embodiment determined from the fractional positions of the chroma (or luma) data elements in each group, e.g., and in an embodiment, so as to represent a measure of the distance of the chroma (or luma) data element from the texture position to be determined.

For example, the following expressions (3) to (6) could be used to determine a weight for each of the four chroma (or luma, by replacing references to "chroma" with "luma") data element values around (closest to) the sample position (top left, top right, bottom left and bottom right, respectively):

$$\text{weight\_top\_left}=(1-\text{chroma\_texel\_index\_frac\_}x)*(1-\text{chroma\_texel\_index\_frac\_}y) \quad (3)$$

$$\text{weight\_top\_right}=\text{chroma\_texel\_index\_frac\_}x*(1-\text{chroma\_texel\_index\_frac\_}y) \quad (4)$$

$$\text{weight\_bottom\_left}=(1-\text{chroma\_texel\_index\_frac\_}x)*\text{chroma\_texel\_index\_frac\_}y \quad (5)$$

$$\text{weight\_bottom\_right}=\text{chroma\_texel\_index\_frac\_}x*\text{chroma\_texel\_index\_frac\_}y \quad (6)$$

where chroma_texel_index_frac_x and chroma_texel_index_frac_y are the fractional parts of the x and y sample position indices, respectively, and can be determined with the following expressions:

$$\text{chroma\_texel\_index\_frac\_}x=\text{frac}(\text{sample\_position\_}x*\text{macrotexel\_horizontal\_count}-\text{chroma\_offset\_}x) \quad (7)$$

and $$\text{chroma\_texel\_index\_frac\_}y=\text{frac}(\text{sample\_position\_}y*\text{macrotexel\_vertical\_count}-\text{chroma\_offset\_}y) \quad (8)$$

chroma_offset_x and chroma_offset_y are provided in tables for each of three chroma sub-sampling modes above. In the case that the above formulae (3)-(8) are used to determine luma weights, the offsets for luma are provided in tables below.

In the case for, e.g., YUV444 texturing, where a macrotexel contains one chroma and one luma sample, chroma_offset_x and chroma_offset_y both equal 0.5, and macrotexel_horizontal_count and macrotexel_vertical_count equal the width and height of the texture in number of texels, respectively.

In one embodiment, the interpolation weights for the luma and chroma data values are computed separately, in an embodiment in parallel (e.g. by using the above formulae (3)-(8) for both chroma and luma data values).

In an embodiment, the fractional values for the luma samples are calculated from the fractional values for the chroma samples. For example, the interpolation weights for the luma data values may be calculated using the following formulae:

$$\text{luma\_texel\_index\_frac\_}x=\text{frac}(\text{chroma\_texel\_index\_frac\_}x*\text{downsampling\_factor\_}x+\text{luma\_offset\_}x) \quad (9)$$

$$\text{luma\_texel\_index\_frac\_}y=\text{frac}(\text{chroma\_texel\_index\_frac\_}y*\text{downsampling\_factor\_}y+\text{luma\_offset\_}y) \quad (10)$$

where
downsampling_factor_x is 1 for YUV444 and 2 for YUV420 and YUV422 and
downsampling_factor_y is 1 for YUV444 and YUV422 and 2 for YUV420.

The offsets luma_offset_x and luma_offset_y can be found from these tables:

| YUV444 | | | |
|---|---|---|---|
| Chroma siting X | Chroma siting Y | luma_offset_x | luma_offset_y |
| Co-sited | Co-sited | 0.0 | 0.0 |
| Centre | Co-sited | 0.0 | 0.0 |
| Co-sited | Centre | 0.0 | 0.0 |
| Centre | Centre | 0.0 | 0.0 |

| YUV422 | | | |
|---|---|---|---|
| Chroma siting X | Chroma siting Y | luma_offset_x | luma_offset_y |
| Co-sited | Co-sited | 0.0 | 0.0 |
| Centre | Co-sited | 0.5 | 0.0 |
| Co-sited | Centre | 0.0 | 0.0 |
| Centre | Centre | 0.5 | 0.0 |

| YUV420 | | | |
|---|---|---|---|
| Chroma siting X | Chroma siting Y | luma_offset_x | luma_offset_y |
| Co-sited | Co-sited | 0.0 | 0.0 |
| Centre | Co-sited | 0.5 | 0.0 |
| Co-sited | Centre | 0.0 | 0.5 |
| Centre | Centre | 0.5 | 0.5 |

The interpolation weights for the luma data samples can then be computed using formulae (3) to (6) above but substituting luma_texel_index_frac_x and luma_texel_index_frac_y for texel_index_frac_x and texel_index_frac_y in these formulae.

Once the interpolation weights for the determined sets of chroma and luma data elements (the chroma and luma data element values around the sample position in question) have been determined (e.g. as described above), they are in an embodiment applied to the chroma and luma data element values around the sample position in question to determine texture data (e.g. weighted sums of the texture data values around the sample position in question) for the sample position in question. This determined texture data is then in an embodiment used to perform image texturing at that sample position.

In an embodiment, where the sampling of the texture for a sampling position would, in effect, require texel values from texels that lie outside the edge of the defined texture (e.g. such as may be the case when sampling at or near to the edge of the texture), then that "edge" situation is in an embodiment treated as a special case with the sampling operation then taking account of that situation. In an such embodiment, such "edge" situations are handled by clamping the "missing" chroma and luma values to the nearest corresponding defined such value for the texture. In an embodiment the luma and chroma values are clamped separately, and the clamping is in an embodiment dependent upon the chroma siting. Thus, in an embodiment, the luma value for a position that will be outside the texture will be clamped to the closest luma value that is defined for the texture in the appropriate direction (and correspondingly for the chroma value).

As described above, when operating in a "replicated chroma" mode, the chroma data values may be replicated on storage into the cache such that a single (replicated) chroma data value is stored associated with each luma data value. However, in an alternative embodiment, the chroma data values may be stored in the cache as in the "unreplicated"

cases (i.e. only once for each chroma data value), but may then be replicated as (or after) they are read from the cache.

In such cases, after the required texture data has been read from the cache, the weights for the luma data values are in an embodiment adjusted such that the output becomes the same as it would be for the case where the chroma data values were stored in a replicated manner in the cache. More specifically, one of the chroma data samples is in an embodiment allocated a weight of 1.0 at all positions within the area between the corresponding luma data samples, and at positions between macrotexels (e.g. between luma data samples from different macrotexels), the chroma data values from the surrounding macrotexels are interpolated (e.g. with bilinear interpolation).

In order to determine the interpolation weight (frac_x_chr and frac_y_chr) for a chroma data value (U and V, respectively) using this replicated chroma technique, the following formulae may be used.

First:

$$\text{frac\_x\_chr} = \text{frac}(\text{texel\_x}) \quad (11)$$

$$\text{frac\_y\_chr} = \text{frac}(\text{texel\_y}) \quad (12)$$

then:

$$\text{frac\_x\_chr} = \max(\min(\text{frac\_x\_chr}*2 - 0.5, 1.0), 0.0) \quad (13)$$

$$\text{frac\_y\_chr} = \max(\min(\text{frac\_y\_chr}*-20.5, 1.0), 0.0) \quad (14)$$

Where texel_x and texel_y are the x and y coordinates for the texture position being sampled.

This weight adjusting process is in an embodiment performed at the beginning of the weight-calculation process.

In the above description, the texture data surrounding a sampling position is determined and interpolated to provide texture data for that sampling position. However, in an alternative embodiment, there is no interpolation and the texture data for one macrotexel corresponding to a sampling position is simply read and used as the texture data for that sampling position. For example, the top left macrotexel (i.e. the macrotexel with the above left chroma data position to a sampling position) may be read and its chroma data value used for a sampling position.

In such cases, the above formulae (1) and (2) are in an embodiment modified to be:

$$\text{texel\_index\_x} = \text{floor}(\text{sample\_position\_x}*\text{width}) \quad (1')$$

and $$\text{texel\_index\_y} = \text{floor}(\text{sample\_position\_y}*\text{height}) \quad (2')$$

In alternative embodiments, a different macrotexel could be used (e.g. top right, bottom left or bottom right). Alternatively, the macrotexel with the chroma data value closest to the sampling position could be determined and read. If the read macrotexel contains more than one luma data value then, similarly, a single luma data value (e.g. the top left, top right, bottom left, bottom right or closest) could be used as the luma data value for the sampling position in question.

In such cases, as there is no interpolation, this can lead to a "blocky" appearance of the generated texture, e.g. if it is magnified. However, such a mode is sometimes used in graphics processing.

As will be appreciated from the above, the technology described herein is in an embodiment implemented in a system comprising a memory, a cache and a graphics processing unit (GPU). Texture data for a render output (e.g. image to be displayed) is in an embodiment stored in the memory. The GPU is in an embodiment arranged to fetch required texture data from the memory and to store it in the cache, in the manner described above. The GPU then in an embodiment reads required texture data from the cache for generating the render output (e.g. in the manner described above). The render output, once generated in this way, is then in an embodiment displayed, e.g. on a display such as a digital television, computer screen or the like.

The technology described herein can be used for any form of output that the graphics processing system may be being used to generate. In an embodiment it is used when a graphics processing system is being used to generate images for display, but it can be used for any other form of graphics processing output, such as graphics textures in a render-to-texture operation, etc., that a graphics processing system may produce, as desired.

The graphics processing system in an embodiment includes a graphics processor, e.g., and in an embodiment, that implements and executes a graphics processing pipeline to perform graphics processing. In an embodiment, the graphics processing system includes a host processor that executes applications that can require graphics processing by the graphics processing pipeline and graphics processor. The system in an embodiment further includes appropriate storage (e.g. memory), caches, etc.

The technology described herein can be used in and with any suitable and desired graphics processing system and processor.

The technology described herein is particularly suitable for use with tiled renderers (tile-based graphics processing systems). Thus, in an embodiment, the graphics processor (processing pipeline) is a tiled-based graphics processor (processing pipeline).

The graphics processor (processing pipeline) can include, and in an embodiment does include, any one or more, and in an embodiment all, of the processing stages that a graphics processor (processing pipeline) can normally include. Thus, for example, the graphics processor in an embodiment includes a primitive setup stage, a rasteriser and a renderer. In an embodiment the renderer is in the form of or includes a programmable fragment shader.

The graphics processor (processing pipeline) in an embodiment also comprises one or more programmable shading stages, such as one or more of, and in an embodiment all of, a vertex shading stage, a hull shader, a tessellation stage (e.g. where tessellation is performed by executing a shader program), a domain (evaluation) shading stage (shader), a geometry shading stage (shader), and a fragment shader.

The graphics processor (processing pipeline) may also contain any other suitable and desired processing stages that a graphics processing pipeline may contain such as a depth (or depth and stencil) tester(s), a blender, a tile buffer or buffers, a write out unit etc.

The graphics processing system and/or processor in an embodiment also comprises, and/or is in communication with, one or more memories and/or memory devices that store the data described herein, and/or that store software for performing the processes described herein. The graphics processing system and/or processor may also be in communication with a host microprocessor, and/or with a display for displaying images based on the data generated by the graphics processor (processing pipeline).

In an embodiment, the various functions of the technology described herein are carried out on a single graphics processing platform that generates and outputs the rendered fragment data that is, e.g., written to the frame buffer for the display device.

The technology described herein can be implemented in any suitable system, such as a suitably configured microprocessor based system. In some embodiments, the technology described herein is implemented in computer and/or micro-processor based system.

The various functions of the technology described herein can be carried out in any desired and suitable manner. For example, the functions of the technology described herein can be implemented in hardware or software, as desired. Thus, for example, the various functional elements, stages, etc. of the technology described herein may comprise a suitable processor or processors, controller or controllers, functional units, circuit or circuits, circuitry, processing logic, microprocessor arrangements, etc., that are operable to perform the various functions, etc., such as appropriately dedicated hardware elements (processing circuits/circuitry) and/or programmable hardware elements (processing circuits/circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Furthermore, any one or more or all of the processing stages of the technology described herein may be embodied as processing stage circuit/circuitry, e.g., in the form of one or more fixed-function units (hardware) (processing circuits/circuitry), and/or in the form of programmable processing circuit/circuitry that can be programmed to perform the desired operation. Equally, any one or more of the processing stages and processing stage circuit/circuitry of the technology described herein may be provided as a separate circuit element to any one or more of the other processing stages or processing stage circuit/circuitry, and/or any one or more or all of the processing stages and processing stage circuits/circuitry may be at least partially formed of shared processing circuits/circuitry.

It will also be appreciated by those skilled in the art that all of the described embodiments of the technology described herein can include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a dataprocessor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or other system comprising data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

Figure 12:
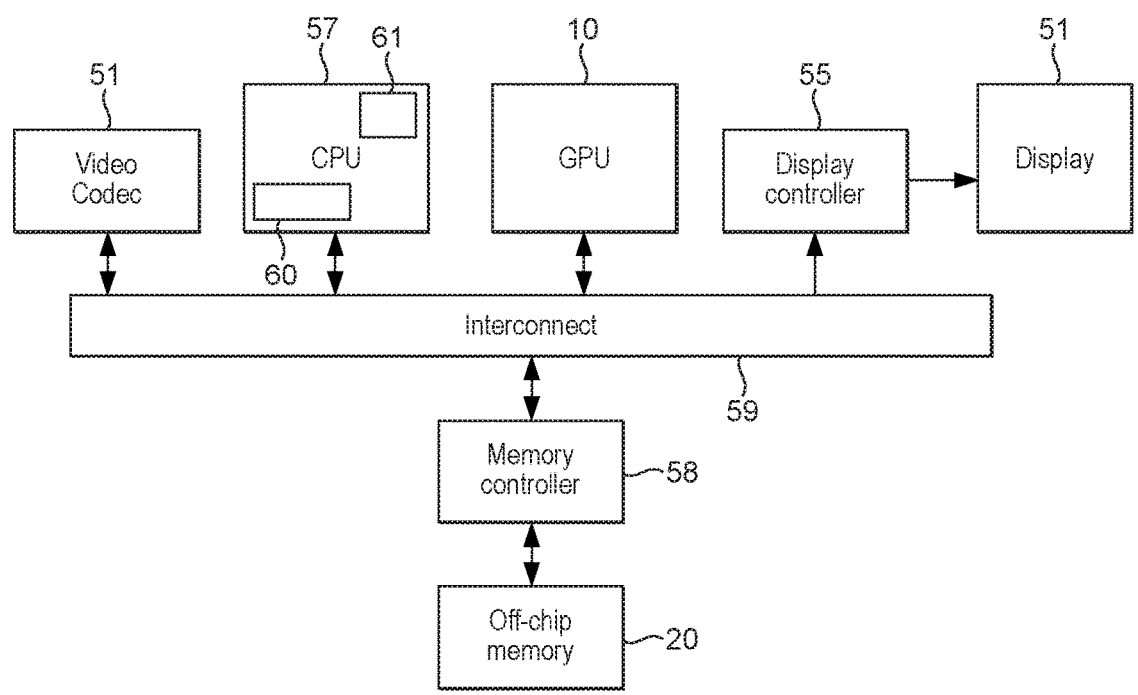
FIG. 12 shows an exemplary data processing system in which the technology described herein may be implemented.

FIG. 12 shows an exemplary data processing system in which the technology described herein and the present embodiment may be implemented.

The exemplary data processing system shown in FIG. 12 comprises a host processor comprising a central processing unit (CPU) 57, a graphics processing unit (GPU) 10, a video codec 51, a display controller 55, and a memory controller 58. As shown in FIG. 12, these units communicate via an interconnect 59 and have access to off-chip memory 20. In this system the GPU 10, video codec 51, and/or a CPU 57 will generate frames (images) to be displayed, and the display controller 55 will then provide the frames to a display 54 for display.

In use of this system, an application 60, such as a game, executing on the host processor (CPU) 57, will, for example, require the display of frames on the display 54. To do this, the application 60 will submit appropriate commands and data to a driver 61 for the graphics processing unit 10 that is executing on the CPU 57. The driver 61 will then generate appropriate commands and data to cause the graphics processing unit 10 to render appropriate frames for display and to store those frames in appropriate frame buffers, e.g. in the main memory 20. The display controller 55 will then read those frames into a buffer for the display from where they are then read out and displayed on the display panel of the display 54.

The present embodiments and the technology described herein relate in particular to the situation where the graphics processing unit 10 is using a texture, and in particular a YUV texture, when rendering a frame for output (e.g. for display). Such textures will comprise arrays of data elements (texture elements (texels)), each having an associated data value or values in the data format of the texture in question.

The textures will typically comprise images that are to be applied to graphics entities, such as primitives and primitives, to be rendered, and will normally be stored in the off-chip memory 20 from where they can then be read in by the GPU 10 when required. In particular, when using a texture to generate a render output, the GPU 10 will fetch the texture data from the memory 20 and store it in a local, texture cache of the GPU 10. The texture data will then be read from the texture cache, when needed, and used to generate the render output, e.g. frame for display.

Figure 2:
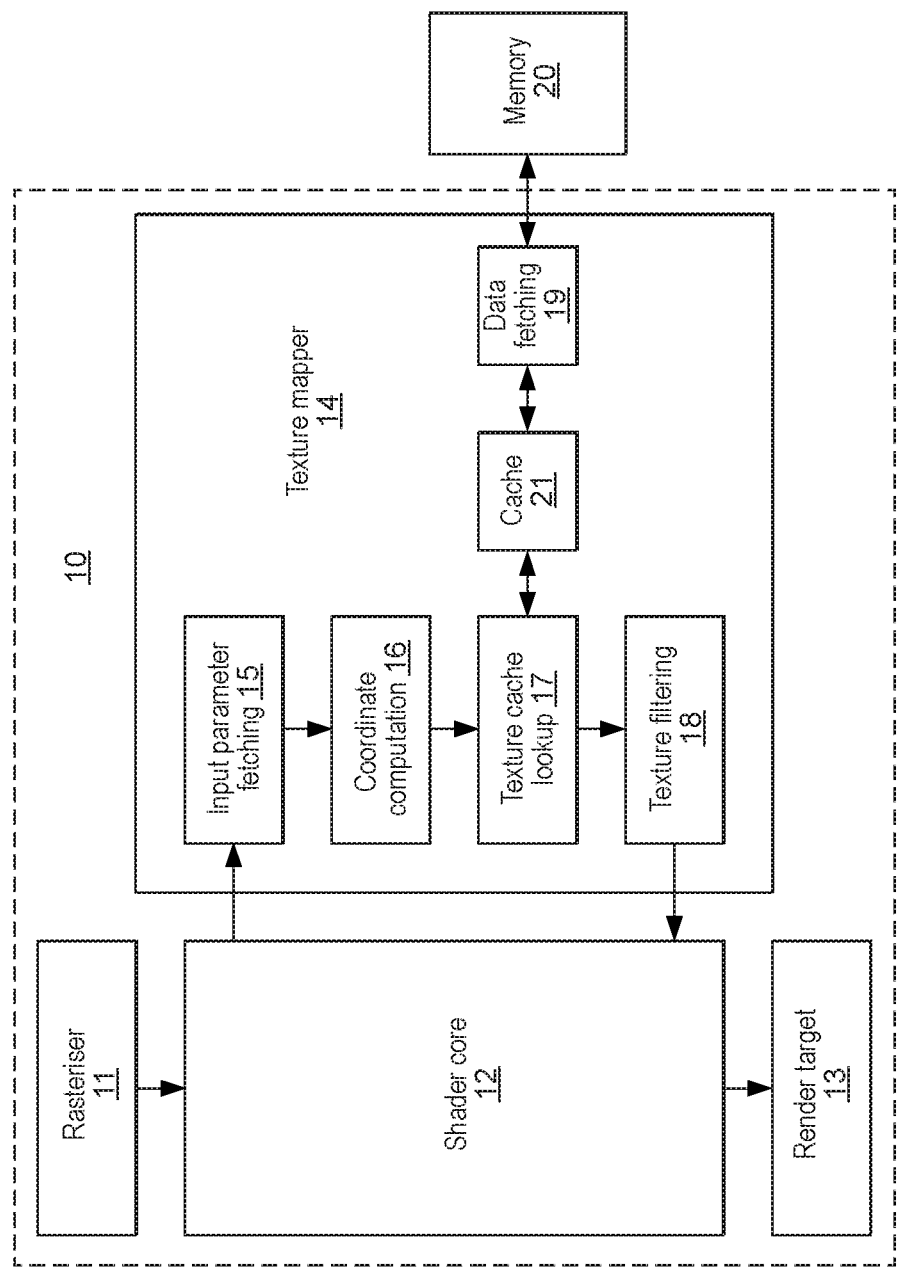
FIG. 2 shows schematically a graphics processing system in which an embodiment of the technology described herein may be implemented.

FIG. 2 shows schematically the elements of the graphics processing unit 10 of the system shown in FIG. 12 that are relevant to the operation of the present embodiments. As will be appreciated by those skilled in the art, there may be other elements of the graphics processing unit 10 that are not illustrated in FIG. 2.

In the present embodiment, the GPU 10 is a tile-based graphics processor. However, other arrangements are, of course, possible.

As shown in FIG. 2, the graphics processing unit 10 implements a graphics processing pipeline that includes, inter alia, a rasterizer 11, a renderer in the form of a (programmable) shader core 12, a buffer 13 (e.g. in memory 20) for storing the output render target (e.g. frame to be displayed) and a texture mapper 14, and is in communication with the system memory 20.

The system memory 20 will store, inter alia, graphics textures to be used by the GPU 10. The system memory 20 may, e.g., be a disk drive or other storage medium (e.g. a hard disk, a RAID array of hard disks or a solid state disk) of or accessible to the host system in which the graphics processing unit 10 is located, and may be an internal storage medium of the host system, or an external or removable storage medium.

The texture mapper 14 contains an input parameter fetching unit 15, a coordinate computation unit 16, a texture cache lookup unit 17, a texture filtering unit 18, a texture cache 21 for storing texture data, and a data fetching unit 19.

The texture cache 21 is a local memory for storing texture data, and may, e.g., comprise a RAM. It may be in the form of an SRAM memory. Other arrangements would, of course, be possible.

The arrows in FIG. 2 indicate the main ways in which data flows between the various components of the graphics processing pipeline and the memory 20. There may also be other communication routes or directions that are not indicated.

The rasterizer 11 receives as its input primitives (e.g. triangles) to be used to generate a render output, such as a frame to be displayed, and rasterizes those primitives into individual graphics fragments for processing. To do this, the rasterizer 11 rasterizes the primitives to sample points representing the render output, and generates graphics fragments representing appropriate sampling positions for rendering the primitives. The fragments generated by the rasterizer 11 are then sent onwards to the shader core (renderer) 12 for shading. The fragments are output from the rasterizer 11 in an order that maximizes the efficiency of the texture cache lookup module 17.

The shader core 12 executes a shader program or programs for the fragments issued by the rasterizer 11 in order to render (shade) the fragments. The shader programs may have no, one, or more, texturing instructions (texturing operations) that are required to be executed by the texture mapper 14. When a texturing instruction is encountered by the shader core 12, a texturing message is sent from the shader core 12 to the texture mapper 14, instructing the texture mapper 14 to follow one or more texturing instructions. After the texture mapper 14 has finished its texture processing (carrying out these instructions), the final result is sent back to the shader core 12 in a response message for use when shading the fragment in question.

The texture mapper 14 includes suitable processing circuitry to perform texturing instructions. This processing circuitry may, e.g., be in the form of a dedicated hardware element that is configured appropriately, or it may, e.g., comprise programmable processing circuitry that has been programmed appropriately. In an embodiment, a dedicated hardware texture mapper is used.

The "shaded" fragment from the shader core 12 is then stored as part of the output render target in the buffer 13, e.g. the main memory 20, e.g. for subsequent display.

Thus, when instructed by the shader core 12, the texture mapper 14 reads textures from the memory 20 (as required), performs various processing steps, and returns a colour sampled from the texture back to the shader core 12.

Within the texture mapper 14, the input parameter fetching unit 15 reads in the parameters of the texture to be sampled and the parameters of how to sample the texture from appropriate state information for the texture.

In the present embodiment, this texture state information comprises a "Texture Descriptor" and a "Sampler Descriptor", respectively. In the present embodiment the "Texture Descriptor" contains parameters such as image width and height (in pixels), the pixel format (for example YUV in the case of the present embodiment or uncompressed RGB or compressed RGB in other cases, etc.), information about the number of mip-map levels associated with the texture, etc. The "Sampler Descriptor" contains parameters such as texture filtering mode, mip-map clamps, border-colour, wrap-modes, etc.

After the parameters of the texture to be sampled have been read by the parameter fetching unit 15, they are passed to the coordinate computation unit 16. The texturing request message from the shader core 12 typically contains the coordinates to sample in the texture given in a normalized coordinate-system where (0.0, 0.0) is the top-left corner of the texture and (1.0, 1.0) is the bottom-right corner of the texture. The coordinate computation unit 16 receives these coordinates, together with the parameters read in the input parameter fetching stage unit 15, and determines the actual texel indices in the texture to be looked up from the texture cache 21.

The texture cache lookup unit 17 checks whether the required texture data is stored in the cache 21 and, if present, reads the texture data from the texture cache 21. For a typical bilinear lookup, texture data from four texels (or macrotexels) are read from a 2×2 texel (or macrotexel) region of the texture.

The texture filtering unit 18 receives the four texels (or macrotexels) of the bilinear lookup from the texture cache lookup unit 17, determines interpolation weights and computes a weighted average of the texture data for the sampling position in question. This is then output to (returned to) the shader core 12.

In cases where the required texture data is not already stored in the texture cache 21, the data fetching unit 19 operates to read the texture data from system memory 20 and store that data in the texture cache 21, for the texture cache lookup unit 17 to then retry its lookup (read) into the texture cache 21. This may be achieved in any suitable and desired manner.

The present embodiments relate in particular to the situation where the texture data that the graphics processing unit 10 is to use when rendering a render output comprises YUV texture data (i.e. a texture for which the relevant image data is stored in a YUV format).

In accordance with the technology described herein, in the present embodiments when using YUV texture data, the texture data is stored in the texture cache 21 such that the YUV texture data for a particular texture position (area) is grouped together into macrotexels as a basic unit of storage, with each macrotexel containing the chroma (U and V) and associated luma (Y) data for the texture position (area) in question.

FIGS. 4 and 5 show examples of macrotexels that are used for different chroma sub-sampling modes in the present embodiments.

In FIGS. 4 and 5 (and also in FIGS. 8, 10 and 11), the crosses represent luma data elements and the circles represent chroma data elements.

Figure 4A:
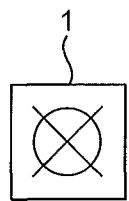
FIGS. 4(a)-(c) show examples of macrotexels for YUV444, YUV422 and YUV420 chroma sub-sampling modes, respectively, each with interstitial chroma samples.

FIG. 4(a) shows an example of a macrotexel 1 for the YUV444 chroma sub-sampling mode, i.e. where the luma and chroma data are stored at the same resolution (there is no sub-sampling), so there is one luma sample and one chroma sample in the macrotexel 1.

Figure 4B:
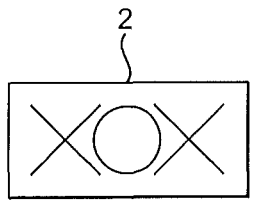

FIG. 4(b) shows an example of a macrotexel 2 for the YUV422 chroma sub-sampling mode, i.e. where the chroma data is stored at half the resolution of luma data horizontally but at the same resolution as luma data vertically, so there are two luma samples and one chroma sample in the macrotexel 2, arranged horizontally.

Figure 4C:
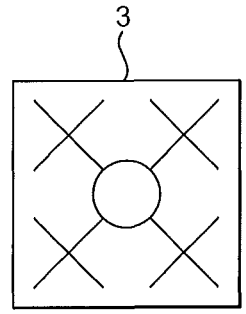

FIG. 4(c) shows an example of a macrotexel 3 for the YUV420 chroma sub-sampling mode, i.e. where the chroma data is stored at half the resolution of luma data both horizontally and vertically, so there are four luma samples and one chroma sample in the macrotexel 3.

In the examples in FIG. 4, the chroma samples are shown centred in each macrotexel 1, 2, 3. This is referred to as "interstitial chroma". In an alternative "interstitial chroma" macrotexel for YUV420 (not shown), the chroma sample is located between two of the luma samples (e.g. the top two luma samples).

However, the location of the chroma samples in a macrotexel can vary further depending on the particular mode being used.

FIGS. 5(a)-(d) show further examples of macrotexels for YUV422 ((a) and (b)) and YUV420 ((c) and (d)) chroma sub-sampling modes.

Figure 5A:
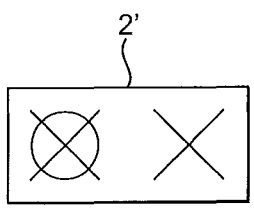
FIGS. 5(a)-(d) show further examples of macrotexels for YUV422 ((a) and (b)) and YUV420 ((c) and (d)) chroma sub-sampling modes, with co-sited or replicated chroma samples.

FIG. 5(a) shows a YUV422 macrotexel 2' with "co-sited" chroma, i.e. the chroma sample is located at the same position as a (the left, in this case) luma sample.

Figure 5B:
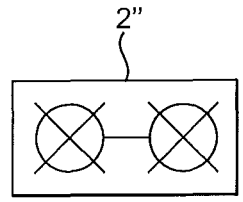

FIG. 5(b) shows a YUV422 macrotexel 2" with "replicated" chroma, i.e. the chroma sample is replicated at both luma sample positions. In this case, the whole area between the luma samples has the same chroma value and, in further processing, the chroma value is only interpolated in the region between macrotexels. The line joining the two chroma samples indicates that they have the same value.

Figure 5C:
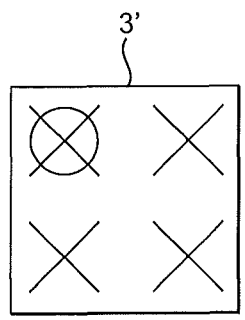

FIG. 5(c) shows a YUV420 macrotexel 3' with "co-sited" chroma. In this case, the chroma sample is co-sited with (proved at the same position as) the top left luma sample.

Figure 5D:
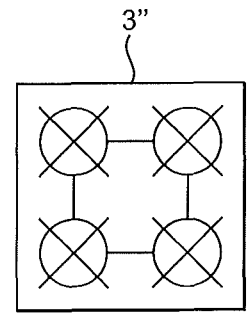

FIG. 5(d) shows a YUV420 macrotexel 3" with "replicated" chroma, i.e. the chroma sample is replicated at each of the four luma sample positions and the whole area between the luma samples has the same chroma value. As with FIG. 5(b), in this case, in further processing, the chroma value is only interpolated in the region between macrotexels. Again, the line joining the chroma samples indicates that they have the same value.

Thus, in the present embodiments, the YUV texture data is fetched from the memory 20 and stored in the cache 21 in groups, or macrotexels, such as those shown in FIGS. 4(a)-(c) or 5(a)-(d), depending on the chroma sub-sampling mode used.

In the present embodiments, the texture cache 21 in which the texture data is stored contains a number of cache lines. Each cache line stores a number of data words (e.g. sixteen), and each data word stores the texture data for one macrotexel. Each data word contains a number of data fields (e.g. depending on the chroma sub-sampling mode being used, and whether or not replicated chroma is being used), and each data field stores the data for one texture data element (e.g. Y, U or V).

Figure 6:
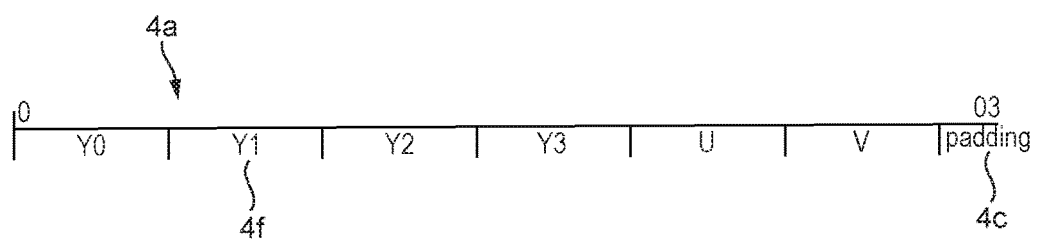
FIG. 6 shows an embodiment of how texture data from a YUV420 macrotexel can be stored in a data word.

FIG. 6 shows an example of how one YUV420 macrotexel 3, containing one U chroma value, one V chroma value, and four luma values (Y0-Y3), can be stored in a 64 bit data word 4a. In this example, 10 bits are provided in each of six fields 4b for the four luma, Y0, Y1, Y2 and Y3, and two chroma, U and V, sample values, respectively, and 4 bits are padded with dummy values (or a transparency mask (e.g.)) 4c, to get a total of 64 bits in the data word 4a.

In the embodiment shown in FIG. 6, the four luma values Y0, Y1, Y2 and Y3 are stored first in the word 4a, followed by the chroma U and V values, and then the 4 bits of dummy values 4c. However, in other embodiments, other orders of the luma, chroma and dummy (or other) values can be used.

Figure 7:
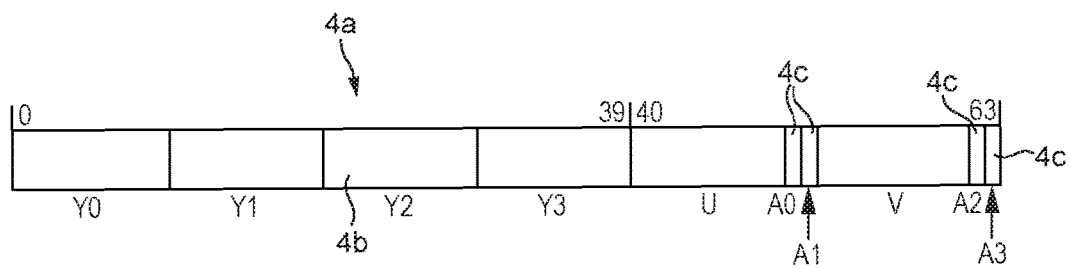
FIG. 7 shows another embodiment of how texture data from a YUV420 macrotexel can be stored in a data word.

FIG. 7 shows an alternative example of how one YUV420 macrotexel can be stored in a 64 bit data word 4a. In this example, again, 10 bits are provided in fields 4b for each of the four luma Y0, Y1, Y2 and Y3, and two chroma, U and V, sample values, and 4 bits 4c are padded with dummy (or other) values A0, A1, A2 and A3, to get a total of 64 bits in the data word 4a. In this case, the four luma values Y0, Y1, Y2 and Y3 are stored first in the word 4a, followed by the chroma U value, then two bits (A0 and A1) of dummy (or other) values, followed by the chroma V value, and then two further bits (A2 and A3) of dummy (or other) values.

Figure 8:
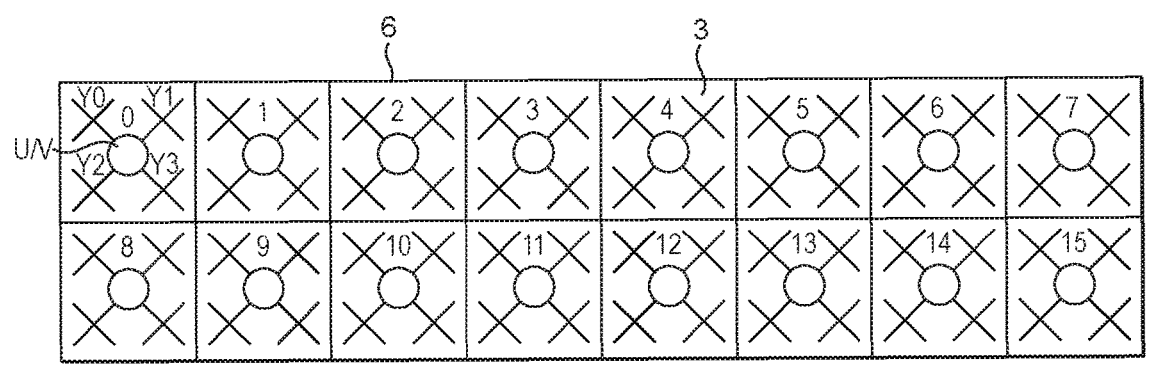
FIG. 8 illustrates a region of a texture whose texture data is stored in one texture cache line, according to an embodiment of the technology described herein.

FIG. 8 illustrates a region 6 of a texture whose texture data values are, according to an embodiment, stored together in a cache line. In this case, the region 6 contains sixteen macrotexels 3 in an 8×2 arrangement (two rows of eight macrotexels). The macrotexels 3 are numbered 0 to 15 in rows from left to right, and from top row to bottom row. The luma samples in each macrotexel 3 are numbered Y0 to Y3, as indicated in the top left macrotexel in the region 6.

Figure 9:
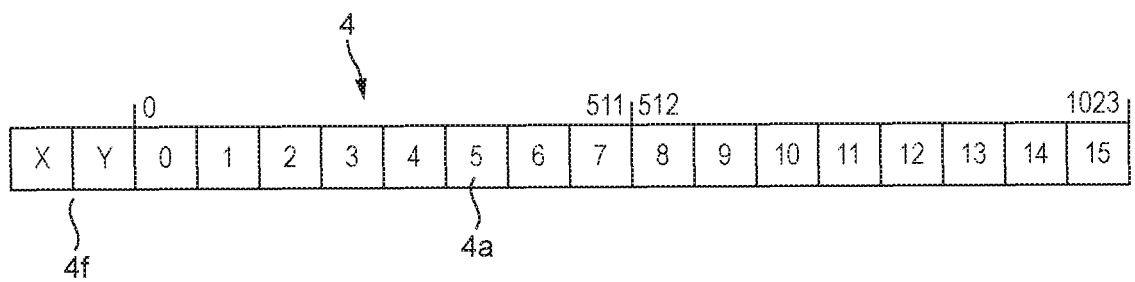
FIG. 9 shows an embodiment of how texture data from sixteen macrotexels is stored in a cache line, according to an embodiment of the technology described herein.

FIG. 9 shows how the sixteen macrotexels 3 from the region 6 of the texture shown in FIG. 8 can be stored in a cache line 4, according to an embodiment. The macrotexels 3 (0 to 15) are stored in order (from 0 to 15) in consecutive data words 4a in the cache line 4.

Each data word 4a has 64 bits (as discussed above) and the cache line 4 contains 16 data words 4a (corresponding to the sixteen macrotexels whose texture data it contains) so, as indicated in FIG. 9, the cache line 4 contains 1024 bits.

The cache line 4 is tagged 4f with the X, Y position of the region (chunk) of the texture that the set of sixteen macrotexels 3 stored in the cache line correspond to (come from). This will be discussed in more detail below.

In other embodiments, different (or the same) sized cache lines are possible containing different numbers of macrotexels (data words), and/or different sized data words (e.g. for different sub-sampling modes, with a different number of data fields).

Figure 18:
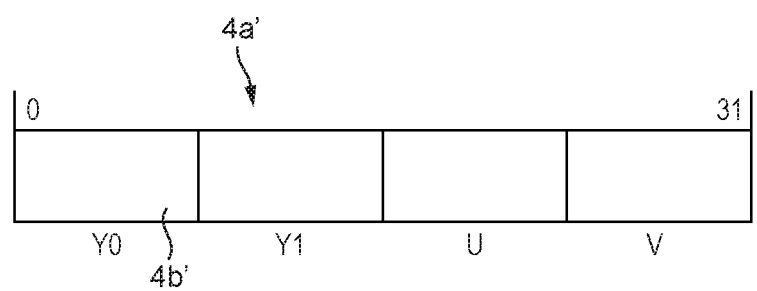
FIG. 18 shows an embodiment of how texture data from a YUV422 macrotexel can be stored in a data word.

For example, FIG. 18 shows an example of how one YUV422 macrotexel can be stored in a 32 bit data word 4*a'*. In this example, 8 bits are provided in fields 4*b'* for each of the two luma, Y0 and Y1, and two chroma, U and V, sample values. This fills the whole data word 4*a'* so in this case there is no padding of the data word with dummy (or other) values. The two luma values Y0 and Y1 are stored first in the word 4*a'*, followed by the chroma U value, then the chroma V value.

FIG. 16 illustrates a region 6' of a texture in the YUV422 sub-sampling mode, whose texture data values are, according to an embodiment, stored together in a cache line. In this case, the region 6' contains 32 YUV422 macrotexels 2 in an 8×4 arrangement (four rows of eight macrotexels). The macrotexels 2 are numbered 0 to 31 in rows from left to right, and from top row to bottom row. The luma samples in each macrotexel 2 are numbered Y0 and Y1, as indicated in the top left macrotexel in the region 6'.

FIG. 17 shows how the 32 macrotexels 2 from the region 6' of the texture shown in FIG. 16 can be stored in a cache line 4, according to an embodiment. The macrotexels 2 (0 to 31) are stored in order (from 0 to 31) in consecutive data words 4*a'* in the cache line 4.

Each data word 4*a'* has 32 bits (as discussed above) and the cache line 4 contains 32 data words 4*a'* (corresponding to the 32 macrotexels whose texture data it contains) so, as indicated in FIG. 17, the cache line 4 contains 1024 bits.

Again, the cache line 4 is tagged 4*f* with the X, Y position of the region 6' in the texture that the macrotexels 2 stored in the cache line correspond to (come from).

Figure 19:
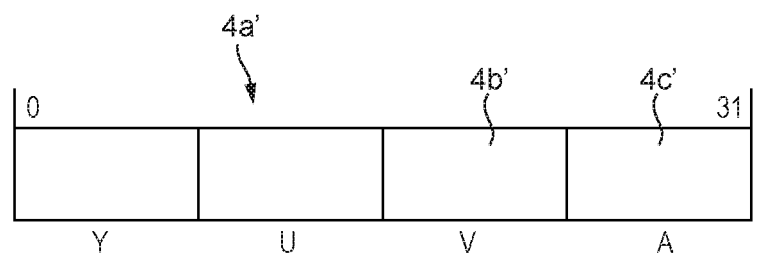
FIG. 19 shows an embodiment of how texture data from a YUV444 macrotexel can be stored in a data word.
Figure 20:
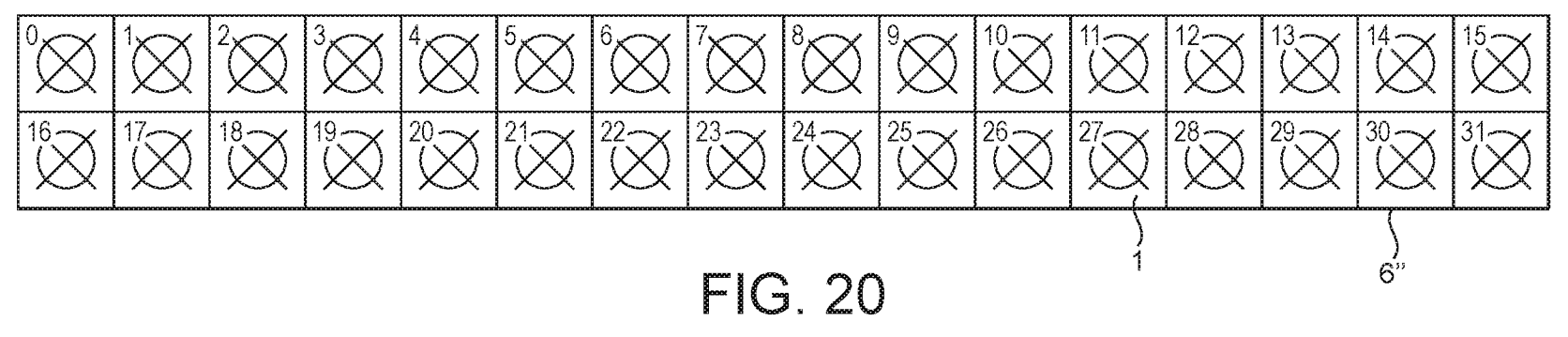

A further example is presented in FIGS. 19 and 20.

FIG. 19 shows an example of how one YUV444 macrotexel can be stored in a 32 bit data word 4*a'*. In this example, 8 bits are provided in fields 4*b'* for each of the luma, Y, and two chroma, U and V, sample values, and 8 bits are provided in field 4*c'* padded with a value A, to get a total of 32 bits in the data word 4*a'*. In this case, the luma value Y is stored first in the word 4*a'*, followed by the chroma U value, the chroma V value, and then the value A. The value A is typically used to encode transparency, on a scale from 0.0 to 1.0, where a value of 1.0 means fully opaque and a value of 0.0 means fully transparent.

FIG. 20 illustrates a region 6" of a texture in the YUV444 mode (so with no sub-sampling of the chroma data), whose texture data values are, according to an embodiment, stored together in a cache line. In this case, the region 6" contains 32 YUV444 macrotexels 1 in a 16×2 arrangement (two rows of sixteen macrotexels). The macrotexels 1 are numbered 0 to 31 in rows from left to right, and from top row to bottom row.

FIG. 17 shows how the 32 macrotexels 1 from the region 6" of the texture shown in FIG. 20 can be stored in a cache line 4, according to an embodiment. The macrotexels 1 (0 to 31) are stored in order (from 0 to 31) in consecutive data words 4*a'* in the cache line 4.

Again, the cache line 4 is tagged with the X, Y position of the region 6" in the texture that the macrotexels 2 stored in the cache line correspond to (come from).

In cases where the chroma data is replicated, the replication of the chroma data may be performed either before the data is written into the cache line 4, or after readout from the cache line 4. If the replication is performed before the data is written into the cache line 4, then the data structure in the cache line 4 will be same as for the mode YUV444 described above and shown in FIGS. 17, 19 and 20. If the replication is performed after readout from the cache line 4, then the data structure in the cache line 4 will be the same as it would be if the chroma data were not replicated (e.g. corresponding to that discussed above for mode YUV420 or YUV 422).

As explained above, each cache line 4 stores a block of macrotexels. In one example, the cache line 4 stores 16 macrotexels from an 8×2 block 6 in the texture. Alternatively, e.g. in the case of the texture data in memory being in a block-based compressed form, the cache line 4 could contain 16 macrotexels from a 4×4 block of macrotexels. Different size and/or shape blocks could be used in other embodiments.

In order to facilitate storing the texture data in the cache 21, each cache line is addressable in units of four bits, i.e. each data field 4*b* (or 4*b'*) can be separately addressed for filling with the appropriate texture data.

Texture data elements may be returned from the memory 20 in any order. Thus, it is necessary to determine which data field 4*b* (or 4*b'*) in the cache line a returned texture data element value should be stored in (the data fields 4*b* (or 4*b'*) may be filled in any order in time, and not necessarily sequentially), and to then store the returned texture data element in that determined data field 4*b* (or 4*b'*).

In the present embodiments, the relevant data field 4*b* (or 4*b'*) for a returned texture data element value is determined based on the (relative) position within the texture of the macrotexel that the data element belongs to.

In the present embodiments, the data word 4*a* (or 4*a'*) in a cache line in which a returned texture data element value is stored is based on the relative position of the macrotexel to which it corresponds in the region 6 (or 6' or 6") of the texture (e.g. as shown in FIG. 8 (or FIG. 16 or 20)) that the cache line is being used to store (e.g. corresponds to the number (when counting left to right, from top left to bottom right) of the macrotexel to which it corresponds in the region 6 (or 6' or 6") of the texture (e.g. as shown in FIG. 8 (or FIG. 16 or 20))).

The data field 4*b* (or 4*b'*) within a data word 4*a* (or 4*a'*) depends on what type of texture data is returned (Y, U or V) and, if it is luma (Y) texture data that is returned, which luma data element it corresponds to within the macrotexel. As described above, the texture data elements are always stored in the data words 4*a* (or 4*a'*) in the same order (i.e. in the same relative data fields 4*b* (or 4*b'*)).

As discussed above, each cache line 4 is provided with an associated "tag", to identify the data (the macrotexels) that it is storing.

In the present embodiment, as discussed above, and as illustrated in FIG. 15, each cache line 4 within the texture cache 21 stores texture data (macrotexels) from a respective region (chunk) of the texture. These texture regions (chunks) can accordingly be, and are, as shown in FIG. 15, indexed in x and y (allocated respective x and y coordinates), so as to indicate their relative positions within the overall texture.

Figure 15:
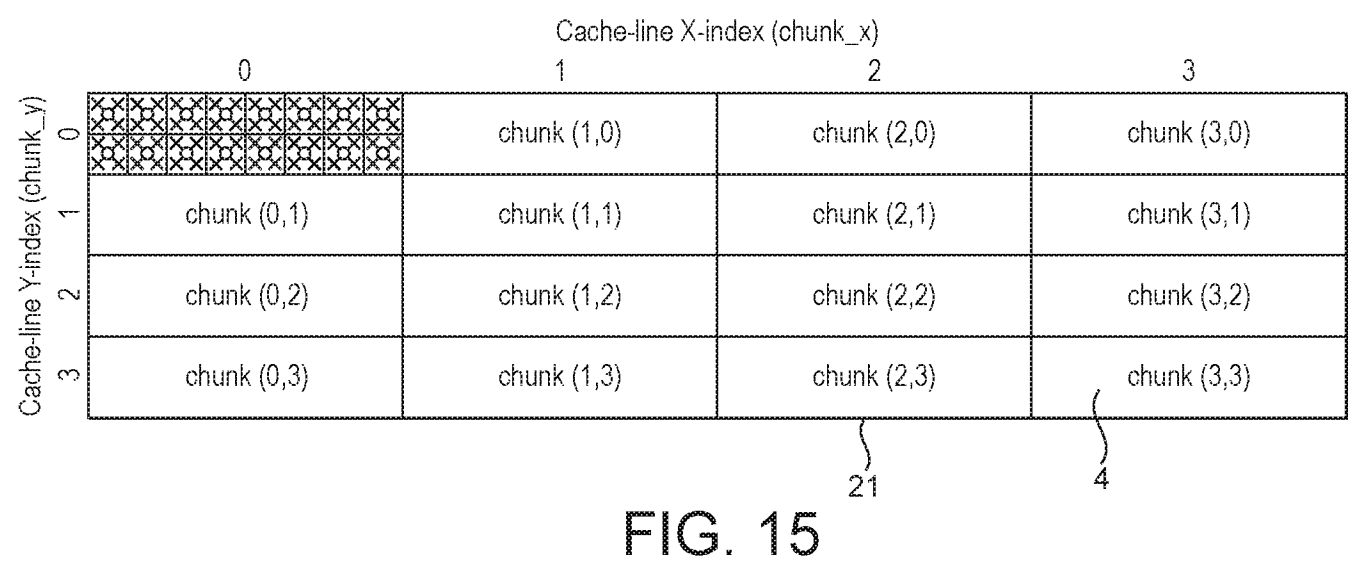

The cache lines 4 are accordingly tagged with the texture region indices (referred to as (chunk_x, chunk_y) in FIG. 15) according to the position in the texture of the region (chunk) that is stored in the cache line.

Thus, in the present embodiments, the tag for a cache line 4 corresponds to the "texture region" indices for the region (chunk) of the texture that the cache line is storing, as indicated in FIG. 15.

Other arrangements would, of course, be possible.

For example, in alternative embodiments the tag for a cache line 4 could comprise a position in the YUV texture, such as the top left (x,y) coordinate of the texture region 6 being stored in the cache line 4 in question. The tag may instead correspond to a different coordinate (e.g. centre or a different corner) of the texture region 6, if desired.

In such arrangements, the top left coordinate of the texture region 6 in an embodiment corresponds to the coordinate of the chroma data element of the top left (i.e. first) macrotexel of the texture region 6 stored in the cache line 4. The coordinate indicates the position of the chroma data element as a position index of the entire texture (i.e. not just in the texture region 6), i.e. where the index (0,0) indicates the top left chroma data element in the texture, (1,0) indicates the next chroma data element along horizontally, and (0,1) indicates the next chroma data element below that at (0,0). Thus, the indices run from (0,0) to (x−1, y−1), where x is the number of chroma data elements horizontally and y is the number of chroma data elements vertically, and the index (x−1, y−1) indicates the bottom right chroma data element in the texture.

In the present embodiments, the 16 macrotexels stored in the cache line 4 correspond to an 8×2 block 6 (two rows of eight) of macrotexels 3 in the texture, as illustrated in FIG. 8. In the YUV420 mode, each macrotexel contains 2×2 luma samples, and one chroma sample, so the 8×2 block of macrotexels corresponds to 16×4 luma samples and 8×2 chroma samples.

A cache line fetch from the memory 20 from a linear 3-plane YUV420 texture therefore involves 8 memory requests: 4 for the 4 contiguous luma scans, 2 for the two lines of chroma in the U plane, and 2 for the two lines of chroma in the V plane.

When each of these memory requests return, which could be in any order, the data (luma and or chroma) is written into the appropriate data field 4b of the appropriate data word 4a in the cache line 4, depending on their position in the texture (as described above). When all eight requests have returned, the cache line is considered "valid" and may be used in texturing processes.

The cache line 4 is only indicated as being "valid" (i.e. that all of the required texture data is stored in the cache line 4 and therefore available for use) once all of the memory requests for the cache line 4 have been returned.

In order to determine when all of the memory requests have returned, a "valid counter" is provided which counts down from the total number of requests (8, in this case) as each memory request is returned, and when all of the memory requests have returned the valid counter is equal to zero and this indicates that the cache line 4 is "valid" (i.e. the texture data is available for use). When the memory requests are first sent, the valid counter is set to equal the number of memory requests sent (i.e. 8, in this case). The valid counter then counts down by 1 each time a memory request is returned. Thus, when the valid counter reaches zero, this indicates that all of the memory requests have returned and the cache line is valid (the texture data is available for use).

In the present embodiments, the YUV texture data is read from the memory 20 and stored directly into the cache 21 (in the appropriate data positions/arrangement). The retrieved texture data is grouped into the appropriate arrangement (i.e. in macrotexels) in the RAM banks of the cache 21 themselves, by utilising bit-strobes for the memory writes. More specifically, when a luma response returns from the memory 20, the bit-enables are set for the luma-bits only in the cache line 4, and the luma data is written into the cache 21. If there was already chroma data in the cache line 4, it will remain unchanged. When the chroma response returns from the memory 20, the bit-enables are set for the chroma bits only in the cache line and the chroma data is written into the cache 21. Any luma data already present in the cache line 4 will remain unchanged. When both responses have come back, the cache line 4 is marked as valid.

In other embodiments, before the YUV texture data is stored in the cache 21, it is first stored in an intermediate buffer (not shown).

Figure 3:
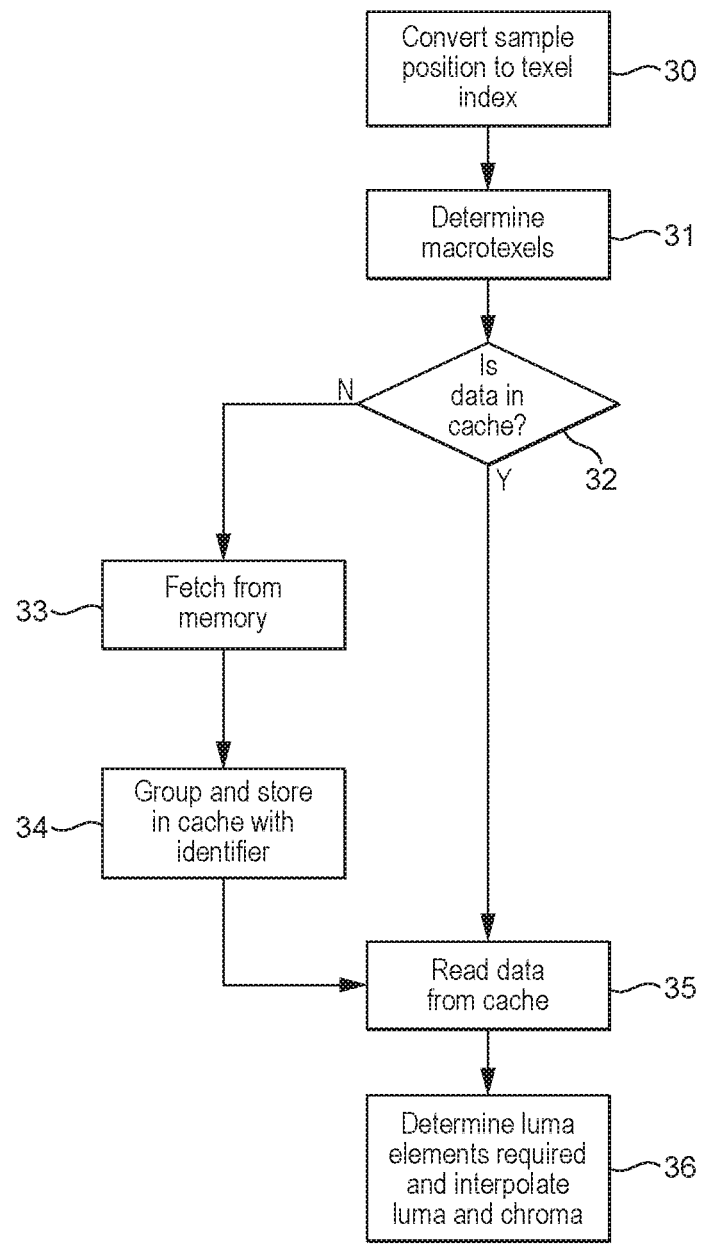
FIG. 3 is a flow diagram illustrating the main steps of a method according to an embodiment of the technology described herein.

FIG. 3 is a flow diagram illustrating the main steps of a method according to an embodiment of the technology described herein.

The method illustrated in FIG. 3 is performed by components of the texture mapper 14 as described below.

At step 30, upon receiving instructions from the shader core 12 for rendering a sampling position in a graphics texture to be rendered (and after the input parameter fetching unit 15 has fetched the input parameters as described above), the coordinate computation unit 16 converts the sampling position in question into the chroma data element indices of a closest (above left) chroma data element to the sampling position. Then, at step 31, the coordinate computation unit 16 determines the other three closest (above right, bottom left and bottom right) chroma data elements to the sampling position such that the four closest chroma data elements surrounding the sampling position are determined.

At step 32, the texture cache lookup unit 17 checks whether the texture data for the macrotexels corresponding to the determined four closest chroma data elements surrounding the sampling position is already stored in the cache 21.

If the required texture data is not already stored in the cache 21, at step 33, the data fetching unit 19 fetches the required texture data from the memory 20. At step 34, the data fetching unit 19 groups (rearranges) this texture data (if required) and stores it in the cache 21 in the required arrangement with an appropriate tag (identifier) (as discussed above). The texture cache lookup unit 17 then performs step 35.

If the required texture data is already present in the cache 21, steps 33 and 34 are omitted and the texture mapper 14 moves straight to step 35.

At step 35, the texture cache lookup unit 17 reads the required texture data from the cache 21.

At step 36, the texture filtering unit 18 performs bilinear interpolation of the relevant texture data read from the cache 21 to determine texture data values for the sampling position in question.

These steps will now be described in more detail.
Step 30

In order to read texture data from the cache 21, the texture mapper 14 addresses the cache 21 storing the YUV texture data using a position for the texture that is indicative of the texture data that is required, namely the texel indices for the texel(s) (or macrotexel(s)) required.

Thus, at step 30, the position in the texture to be sampled is converted into the chroma data element indices of a closest (above left) chroma data element to the sampling position.

In this embodiment, the position to be sampled in the YUV texture is indicated as a fractional position across the width and a fractional position across the height of the texture by providing x and y coordinates in the range 0 to 1, specified as a 2D floating-point vector (specifically a 32-bit IEEE 754-2008 floating point vector).

This sampling position is converted to the position of a closest (specifically, above left) chroma data element in the YUV texture to the position being sampled. (This may not be the closest chroma data element to the position being sampled but it is one of the four closest, specifically the above left).

The above left chroma data element indices (given as x and y coordinates macrotexel_index_x and macrotexel_index_y) are determined using formulae (1) and (2) below, from the x and y coordinates of the indicated sampling position (sample_position_x and sample_position_y, respectively) and the width and height of the YUV texture defined in terms of the number of chroma data elements (positions) across the width and height of the texture (width and height), respectively:

$$\text{macrotexel\_index\_}x = \text{floor}(\text{sample\_position\_}x * \text{macrotexel\_horizontal\_count} - \text{chroma\_offset\_}x) \quad (1)$$

$$\text{macrotexel\_index\_}y = \text{floor}(\text{sample\_position\_}y * \text{macrotexel\_vertical\_count} - \text{chroma\_offset\_}y) \quad (2)$$

where: sample_position_x and sample_position_y, are the x and y coordinates of the position in the texture that is to be sampled, and are defined in the range from 0 to 1 (and thus accordingly give the fractional position of the sample position across the texture); and the "macrotexel_horizontal_count" and "macrotexel_vertical_count" variables correspond to the number of chroma data positions across the width and height of the texture, respectively. For YUV444, macrotexel_horizontal_count and macrotexel_vertical_count are the same as the width and height of the texture measured in texels, respectively. For YUV420 and YUV422, macrotexel_horizontal_count is equal to half of the width of the texture measured in texels. For YUV422 macrotexel_vertical_count is the same as the height of the texture measured in texels. For YUV420, macrotexel_vertical_count is equal to half of the height of the texture measured in texels.

The values for "macrotexel_horizontal_count" and "macrotexel_vertical_count" (width and height, respectively) are obtained by the input parameter fetching unit 15 as described above. These are unsigned integers in a range from 1 to 65536.

The chroma_offset_x and chroma_offset_y values correspond to the fractional horizontal and vertical positions, respectively, of the chroma sample within a macrotexel (referred to as the chroma "siting" within a macrotexel). This is described in more detail below.

The chroma_offset_x and chroma_offset_y values can be found from the following tables for different chroma sitings in chroma sub-sampling modes YUV444, YUV422 and YUV420, respectively:

| YUV444 | | | |
|---|---|---|---|
| Chroma siting X | Chroma siting Y | chroma_offset_x | chroma_offset_y |
| Co-sited | Co-sited | 0.50 | 0.50 |
| Centre | Co-sited | 0.50 | 0.50 |
| Co-sited | Centre | 0.50 | 0.50 |
| Centre | Centre | 0.50 | 0.50 |

| YUV422 | | | |
|---|---|---|---|
| Chroma siting X | Chroma siting Y | chroma_offset_x | chroma_offset_y |
| Co-sited | Co-sited | 0.25 | 0.50 |
| Centre | Co-sited | 0.50 | 0.50 |
| Co-sited | Centre | 0.25 | 0.50 |
| Centre | Centre | 0.50 | 0.50 |

| YUV420 | | | |
|---|---|---|---|
| Chroma siting X | Chroma siting Y | chroma_offset_x | chroma_offset_y |
| Co-sited | Co-sited | 0.25 | 0.25 |
| Centre | Co-sited | 0.50 | 0.25 |
| Co-sited | Centre | 0.25 | 0.50 |
| Centre | Centre | 0.50 | 0.50 |

The difference chroma siting modes are described in more detail below.

Step 31

At step 31, the other three closest (above right, bottom left and bottom right) chroma data elements to the sampling position are determined, such that the four closest chroma data elements surrounding the sampling position are determined. By identifying the four closest chroma data elements to the sampling position, this thus also identifies the four closest macrotexels surrounding the sampling position as each chroma data element corresponds to a single macrotexel.

As explained above, the above formulae identify a closest (above left) macrotexel to the position being sampled. It is then a straightforward process to determine the closest top right, bottom left and bottom right macrotexels to the position being sampled, i.e. by increasing the x and/or y indices by 1. Specifically, to determine the top right macrotexel from the top left macrotexel, the x index is increased by 1, to determine the bottom left macrotexel from the top left macrotexel, the y index is increased by 1, and to determine the bottom right macrotexel from the top left macrotexel, the x and y indices are both increased by 1.

Figure 10:
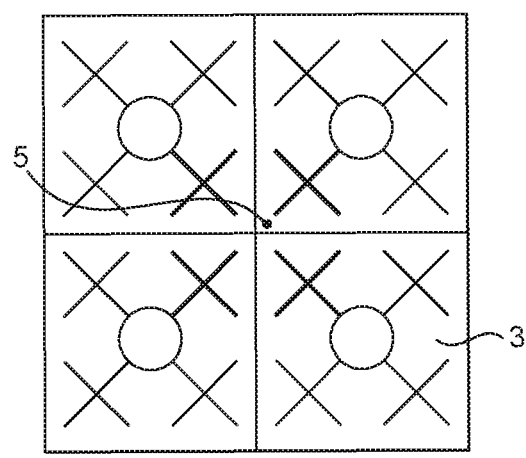
FIG. 10 illustrates which luma data samples would be selected for a particular sampling position, according to an embodiment of the technology described herein.

FIG. 10 illustrates a sample position 5 in a texture surrounded by its four closest macrotexels 3 (top left, top right, bottom left and bottom right).

Step 32

At step 32, the texture cache lookup unit 17 checks whether the texture data for the macrotexels corresponding to the four closest chroma data elements surrounding the sampling position (as determined above) is already stored in the cache 21.

In order to do this, the texture cache lookup unit 17 determines which cache line(s) the texture data for the macrotexels in question would be stored in. This is done by checking the cache line tags (identifiers) to see which of these corresponds to a region (chunk) of the texture that will comprise a block of macrotexels containing one or more of the macrotexels in question. As discussed above, the cache line tags identify (using position indices) regions of the texture (blocks of macrotexels) of a predefined size and shape.

If no cache line is found with a tag corresponding to a block containing one (or more) of the required macrotexels, then the texture cache lookup unit 17 determines that that texture data (the texture data for that macrotexel, or the block containing that macrotexel) is not yet stored in the cache 21.

On the other hand, if a cache line is found with a tag corresponding to a region (block) containing one (or more) of the required macrotexels, then the texture cache lookup unit 17 checks the valid indicator for that cache line. The valid indicator indicates whether or not the cache line contains all of the texture data for the block of macrotexels to which it corresponds. If the valid indicator indicates that the cache line in question is valid, then the texture cache lookup unit 17 determines that the texture data (the texture data for that macrotexel (those macrotexels), or the block containing that macrotexel (those macrotexels)) is stored in the cache 21. On the other hand, if the valid indicator indicates that the cache line in question is not valid, then the texture cache lookup unit 17 determines that the texture data (the texture data for that macrotexel (those macrotexels) is being fetched into the cache 21, but for not yet arrived in the cache 21 (and so stalls its operation until the data arrives in the cache line).

In some cases, all of the required macrotexels will come from a single texture region (block of macrotexels) (and will therefore all be stored in a single cache line). In other cases, the required macrotexels may come from two or four different texture regions (chunks) (blocks of macrotexels) (and will therefore be stored in two or four different cache lines).

If the required texture data is already present (or being fetched into) in the cache 21, the texture mapper 14 omits steps 33 and 34 and moves straight to step 35.

Step 33

If step 32 determines that the required texture data is not already present in (or being fetched into) the cache 21, then step 33 is performed, whereby the data fetching unit 19 fetches the required texture data from the memory 20.

To do this, a cache line is first allocated for the texture data (e.g. using a least recently used allocation process).

In an embodiment of the technology described herein, the YUV texture data (e.g. chroma sub-sampled YUV data (e.g. in the YUV422 or YUV 420 mode)), is stored in the memory 20 as two or three separate data arrays (in a so-called "multi-plane" format), with one data array (plane) containing the luma (Y) information, and one or two other data arrays (planes) containing the chroma (U and V) information. Where one data array (plane) is provided for the chroma data, both the U and V chroma data are stored in the same array. Where two data arrays (planes) are provided for the chroma data, the U chroma data is stored in one array and the V chroma data is stored in the other.

FIGS. 13 and 14 show, respectively, examples of how luma and chroma data from an 8×4 pixel (luma-sample sized) texture region can be stored in memory in separate memory planes (buffers) 50 and 60.

As shown in FIG. 13 the luma data is stored in memory in a memory plane (buffer) 50 containing, in this example, 32 (8×4) luma data samples 51. In the example of these figures, the texture data is provided in the YUV420 sampling mode, so the chroma data is provided at a lower resolution than the luma data. Thus, in the memory plane (buffer) 60 which contains the corresponding chroma data (i.e. corresponding to the luma data stored in memory plane 50), there are only eight (4×2) chroma data samples 61. As shown in the figures, in this example each chroma data sample 61 contains both the U and the V chroma data for that sample.

In other embodiments, the YUV texture data is stored in the memory 20 in other formats such as packed storage (where all the texture data for a macrotexel is stored in one word, e.g. 32-bit or 64-bit) or compressed storage (where a compression scheme is used to compress the data).

In order to fetch the required texture data from the memory 20, the data fetching unit 19 converts the sample index position to the appropriate memory address(es) where the texture data for that texture position is stored in the memory 20.

In some cases, the texture position (index position) is converted into a single memory address, e.g. where all of the texture data (e.g. both chrominance and luminance texture data) for a texture position is stored together in the memory. All of the required texture data may be stored at the single memory address or, alternatively, the texture data may be stored in a number of memory addresses, the other memory addresses being determinable from the single memory address to which the texture position was converted (e.g. the required texture data is stored in a set of, e.g. a series of consecutive, memory address where only one of these, e.g. a first, is needed in order to determine all of the memory addresses from which the required texture data is to be fetched).

In other cases, the texture position is converted into two or more memory addresses, e.g. where the texture data required for each texture position (the texture position in question) is stored in two or more locations (memory positions) in the memory (e.g. in the case where the chrominance and luminance texture data are stored separately, e.g. in two or more data arrays, in the memory).

In one embodiment, the texture position is converted to a memory address (or to two or more memory addresses) by using a look-up table and/or by applying one or more predefined rules or formulae for such a conversion.

In the case where the texture data is stored in memory as illustrated in FIGS. 13 and 14 (as described above), in order to determine the chroma and luma memory addresses for a particular sampling index, the following method can be performed.

The luma sample index position is expressed as (x, y).

The start address (address of sample (0, 0)) in the luma memory buffer 50 is luma_base_address.

The corresponding address in the chroma memory buffer 60 is chroma_base_address.

The address-difference between the start-addresses of two consecutive luma scan-lines is luma_stride and the corresponding value for the chroma buffer 60 is chroma_stride.

The addresses of the luma and chroma data at a sample index position, luma_address and chroma_address, respectively, can then be calculated as:

$$\text{luma\_address} = \text{luma\_base\_address} + y * \text{luma\_stride} + x * \text{luma\_value\_size} \quad (15)$$

where luma_value_size is the size in bytes of the luma value, which in this case (i.e. in the YUV420 sampling mode as shown in FIGS. 13 and 14) is 1.

and $$\text{chroma\_address} = \text{chroma\_base\_address} + \text{floor}(y/2) * \text{chroma\_stride} + \text{floor}(x/2) * \text{chroma\_value\_size} \quad (16)$$

where chroma_value_size is the size in bytes of the chroma value, which in this case (i.e. in the YUV420 sampling mode as shown in FIGS. 13 and 14) is 2.

For 16-bit 2-plane YUV data, luma_value_size would be 2 and chroma_value_size would be 4.

In cases where the chroma data is provided at a different resolution and/or where the U and V chroma data are stored in separate buffers (planes), the formula for the memory address for the chroma data can be modified appropriately (e.g. by replacing y/2 and/or x/2 with y or x, as appropriate).

Once the memory address(es) for the required texture data has(have) been determined, a request is sent to that (those) memory address(es) of the memory 20, and the texture data from that (those) memory address(es) is fetched.

In cases where the luma and the chroma data is stored in the memory 20 in separate planes (arrays) (e.g. as in FIGS. 13 and 14), a separate memory request is sent to each array. The memory requests may return in any order.

A memory address computation unit within the data fetching unit 19 takes the texture region (chunk) indices (coordinates) (as illustrated in FIG. 15 and described above) as inputs and issues multiple memory read requests to fetch the required texture data from memory, to fill the cache line with the texture data corresponding to the texture region (chunk).

When the data is stored in memory as shown in FIGS. 13 and 14, for example, six memory requests are required to fetch all of the required data. Four requests are needed for the four luma scan lines and two requests are needed for the two chroma scan lines. These requests fetch data from the following six memory addresses (luma_0_address to luma_3_address, chroma_0_address and chroma_1_address):

$$\text{luma\_0\_address} = \text{luma\_base\_address} + (\text{chunk\_}y*4+0) \\ *\text{luma\_stride} + \text{chunk\_}x*16*\text{luma\_value\_size} \quad (17)$$

$$\text{luma\_1\_address} = \text{luma\_base\_address} + (\text{chunk\_}y*4+1) \\ *\text{luma\_stride} + \text{chunk\_}x*16*\text{luma\_value\_size} \quad (18)$$

$$\text{luma\_2\_address} = \text{luma\_base\_address} + (\text{chunk\_}y*4+2) \\ *\text{luma\_stride} + \text{chunk\_}x*16*\text{luma\_value\_size} \quad (19)$$

$$\text{luma\_3\_address} = \text{luma\_base\_address} + (\text{chunk\_}y*4+3) \\ *\text{luma\_stride} + \text{chunk\_}x*16*\text{luma\_value\_size} \quad (20)$$

$$\text{chroma\_0\_address} = \text{chroma\_base\_address} + \\ (\text{chunk\_}y*2+0)*\text{chroma\_stride} + \\ \text{chunk\_}x*16*\text{chroma\_value\_size} \quad (21)$$

$$\text{chroma\_1\_address} = \text{chroma\_base\_address} + \\ (\text{chunk\_}y*2+1)*\text{chroma\_stride} + \\ \text{chunk\_}x*16*\text{chroma\_value\_size} \quad (22)$$

where chunk_y and chunk_x are the y and x indices for the texture region (chunk) in question, respectively.

In the above formulae (17)-(22), chunk_x is multiplied by 16 for both luma and chroma. This is because there is only half the number of chroma samples compared to luma, but each of them takes two bytes rather than one.

These memory requests are sent to the memory 20 which will perform the reads. As described above, the responses for the reads can return in any order from the memory 20. The texture cache 21 therefore needs to keep track of what data has returned from the memory 20 and only set the cache line state to "VALID" after all the responses to the memory requests have returned and all the needed data for each response has been written into the texture cache 21. This is done with a request counter for each cache line 4. The request counter is initialized to a value equal to the number of memory requests sent for the cache line 4 in question. For each response that has been written into the cache line 4 in question of texture cache 21, the request counter is decremented by one. Once it reaches zero the cache line state is set to "VALID".

Step 34

After fetching the texture data from the memory 20 as described above, the data fetching unit 19 then, at step 34, groups the texture data retrieved from the memory 20 into the required arrangement (in cases where the texture data was not already in the required format in the memory 20) and stores the grouped texture data in the texture cache 21 with the required identifier (tag) (as discussed above).

Step 35

Once step 32 has determined that the required texture data is present in the cache 21 or, if not, the required texture data has been fetched from the memory 20 and stored in the cache 21 (steps 33 and 34), then, at step 35, the required texture data is read from the cache 21.

The indices of the four chroma data elements of the YUV texture surrounding the sampling position were determined at steps 30 and 31 (see above). These determined chroma data element indices are then used, at step 35, to address the cache 21 to read the texture data for the macrotexels corresponding to those chroma data element indices.

As explained above, each cache line in the texture cache 21 is tagged with an identifier corresponding to the position in the texture of the texture region (block of macrotexels) stored in the cache line in question.

As described above, this identifier (these identifiers) is (are) used to determine whether and where in the cache 21 (e.g. in which cache line(s) 4) the texture data values required for the sample position in question (e.g. as determined above) are stored.

The determined index positions of the required macrotexels are each converted to (or used to determine) cache line positions corresponding to the data words 4a in which the required macrotexels are stored (e.g. as shown in FIG. 9), and the required texture data values (for the macrotexels in question) are then read from the cache 21 from those data words 4a in the relevant cache line(s) 4.

Step 36

Once the texture data values for the four macrotexels (e.g. chroma data positions) to be used for a texture position to be sampled have been read from the cache 21 (step 35), at step 36, the relevant texture data values from those macrotexels are interpolated using bilinear interpolation to determine chroma and luma data values for the texture position being sampled.

Figure 11:
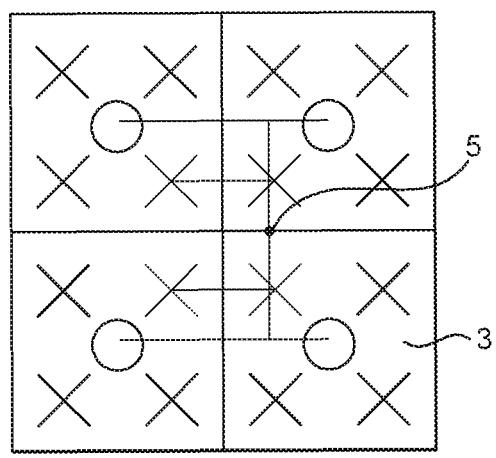
FIG. 11 illustrates bilinear interpolation of luma and chroma texture data, according to an embodiment of the technology described herein.

As each macrotexel only has a single chroma data value associated with it, the chroma data values for the position being sampled 5 are determined by performing bilinear interpolation using the chroma data values from the four macrotexels. This is illustrated in FIG. 11, which shows the four macrotexels 3 surrounding a sampling position 5, and the lines joining the chroma data elements (circles) indicate the bilinear interpolation that is performed.

However, as each macrotexel chroma data value may have more than one luma data value associated with it (e.g. in the case shown in FIG. 11 there are four luma data values in each macrotexel, i.e. associated with each chroma data value), rather than simply using all the (e.g. 16) luma values of all the macrotexels to determine the luma value for the position being sampled, the set of four luma data values closest to the texture position being sampled 5 is determined and then used to determine the luma value for the position being sampled.

Thus, the texture filtering unit 18 determines which four luma data values from the macrotexels 3 are closest to the texture position being sampled 5, and then uses those determined luma values to determine the luma value for the texture position being sampled 5.

In order to determine which four luma data values from the four macrotexels 3 are closest to the texture position being sampled 5 the fractional index position (i.e. the fractional part of the sample index position) of the sample position 5 is inspected, and then a rule(s) or formula(e) is applied to determine which four luma data values are closest to the texture position being sampled 5. Depending on the location of the sample position 5, and the chroma sub-sampling mode being used, the four luma data values required may come from a single, two or four macrotexels. (However, as each macrotexel only contains a single chroma data value, the chroma data values required will always come from four macrotexels.)

In an embodiment, the following formulae are used to select which four luma data values from the set of 2×2 macrotexels should be used (are closest to the sample position):

$$x\_lum = \text{frac}(sample\_position\_x)*2 + offset\_x\_lum \quad (23)$$

$$y\_lum = \text{frac}(sample\_position\_y)*2 + offset\_y\_lum \quad (24)$$

$$x\_lum\_origin = \text{floor}(x\_lum) \quad (25)$$

$$y\_lum\_origin = \text{floor}(y\_lum) \quad (26)$$

where:
sample_position_x and sample_position_y are the x and y coordinates of the sample_position, respectively; and
offset_x_lum and offset_y_lum are the x and y offsets, respectively, of the top left luma data elements within a macrotexel.

The values x_lum_origin and y_lum_origin then are integers within the set {0, 1, 2}. These two values then identify which 2×2 luma-samples should be picked from the 4×4 luma samples (e.g. in the case of the YUV420 chroma sub-sampling mode) read from the texture cache 21, by identifying the top left luma sample of this group, out of the 4×4 luma samples read from the cache 21.

This is illustrated FIG. 11, which shows the selected 2×2 luma samples to be used for interpolation for the sample point 5 being joined by lines.

Once the subset of four luma data values from the macrotexels 3 closest to the texture position being sampled has been determined, those luma data values are interpolated with bilinear interpolation to determine a luma value for the texture sample position 5 in question. This is illustrated in FIG. 11, where the lines joining the four luma data elements (crosses) closest to the sampling position 5 indicate the bilinear interpolation that is performed.

When interpolating data values for a YUV texture in the above manner, the interpolation weights for each of the four chroma (or luma) data elements surrounding the sample position 5 to be determined (weight_top_left, weight_top_right, weight_bottom_left and weight_bottom_right) are determined from the fractional positions of the chroma (or luma) data elements in each macrotexel, so as to represent a measure of the distance of the chroma (or luma) data element from the texture position to be determined. The interpolation weights are calculated such that the samples closest to the sample position 5 are given the largest interpolation weights.

Specifically, the following expressions (3) to (6) are used to determine a weight for each of the four chroma data element values closest to the sample position 5 (top left, top right, bottom left and bottom right, respectively):

$$\text{weight\_top\_left} = (1 - \text{chroma\_texel\_index\_frac}\_x)*(1 - \text{chroma\_texel\_index\_frac}\_y) \quad (3)$$

$$\text{weight\_top\_right} = \text{chroma\_texel\_index\_frac}\_x*(1 - \text{chroma\_texel\_index\_frac}\_y) \quad (4)$$

$$\text{weight\_bottom\_left} = (1 - \text{chroma\_texel\_index\_frac}\_x)*\text{chroma\_texel\_index\_frac}\_y \quad (5)$$

$$\text{weight\_bottom\_right} = \text{chroma\_texel\_index\_frac}\_x*\text{chroma\_texel\_index\_frac}\_y \quad (6)$$

where chroma_texel_index_frac_x and chroma_texel_index_frac_y are the fractional parts of the x and y sample position indices, respectively, and can be determined with the following expressions:

$$\text{chroma\_texel\_index\_frac}\_x = \text{frac}(sample\_position\_x*macrotexel\_horizontal\_count - chroma\_offset\_x) \quad (7)$$

and $$\text{chroma\_texel\_index\_frac}\_y = \text{frac}(sample\_position\_y*macrotexel\_vertical\_count - chroma\_offset\_y) \quad (8)$$

chroma_offset_x and chroma_offset_y are provided in the following tables.

| YUV444 | | | |
|---|---|---|---|
| Chroma siting X | Chroma siting Y | chroma_offset_x | chroma_offset_y |
| Co-sited | Co-sited | 0.50 | 0.50 |
| Centre | Co-sited | 0.50 | 0.50 |
| Co-sited | Centre | 0.50 | 0.50 |
| Centre | Centre | 0.50 | 0.50 |

| YUV422 | | | |
|---|---|---|---|
| Chroma siting X | Chroma siting Y | chroma_offset_x | chroma_offset_y |
| Co-sited | Co-sited | 0.25 | 0.50 |
| Centre | Co-sited | 0.50 | 0.50 |
| Co-sited | Centre | 0.25 | 0.50 |
| Centre | Centre | 0.50 | 0.50 |

| YUV420 | | | |
|---|---|---|---|
| Chroma siting X | Chroma siting Y | chroma_offset_x | chroma_offset_y |
| Co-sited | Co-sited | 0.25 | 0.25 |
| Centre | Co-sited | 0.50 | 0.25 |
| Co-sited | Centre | 0.25 | 0.50 |
| Centre | Centre | 0.50 | 0.50 |

In the case for, e.g., YUV444 texturing, where a macrotexel contains one chroma and one luma sample, chroma_offset_x and chroma_offset_y both equal 0.5, and macrotexel_horizontal_count and macrotexel_vertical_count equal the width and height of the texture in number of texels, respectively.

In one embodiment, the interpolation weights for the luma and chroma data values are computed in parallel (e.g. using formulae (3)-(8) above but modified so that references to "chroma" are replaced with "luma"). In order to do this, weight calculator circuitry is doubled in size (compared to the case where they are computed in series).

In an embodiment, the fractional values for the luma samples are calculated from the fractional values for the chroma samples.

For example, the interpolation weights for the luma data values can be calculated using the following formulae:

$$\text{luma\_texel\_index\_frac\_}x=\text{frac}\\(\text{chroma\_texel\_index\_frac\_}x*\text{downsampling\_}\\\text{factor\_}x+\text{luma\_offset\_}x) \quad (9)$$

$$\text{luma\_texel\_index\_frac\_}y=\text{frac}(\text{chroma\_}\\\text{texel\_index\_frac\_}y*\text{downsampling\_factor}y+\\\text{luma\_offset\_}y) \quad (10)$$

where
downsampling_factor_x is 1 for YUV444 and 2 for YUV420 and YUV422
and
downsampling_factor_y is 1 for YUV444 and YUV422 and 2 for YUV420.

The offsets luma_offset_x and luma_offset_y can be found from these tables:

| YUV444 | | | |
|---|---|---|---|
| Chroma siting X | Chroma siting Y | luma_offset_x | luma_offset_y |
| Co-sited | Co-sited | 0.0 | 0.0 |
| Centre | Co-sited | 0.0 | 0.0 |
| Co-sited | Centre | 0.0 | 0.0 |
| Centre | Centre | 0.0 | 0.0 |

| YUV422 | | | |
|---|---|---|---|
| Chroma siting X | Chroma siting Y | luma_offset_x | luma_offset_y |
| Co-sited | Co-sited | 0.0 | 0.0 |
| Centre | Co-sited | 0.5 | 0.0 |
| Co-sited | Centre | 0.0 | 0.0 |
| Centre | Centre | 0.5 | 0.0 |

| YUV420 | | | |
|---|---|---|---|
| Chroma siting X | Chroma siting Y | luma_offset_x | luma_offset_y |
| Co-sited | Co-sited | 0.0 | 0.0 |
| Centre | Co-sited | 0.5 | 0.0 |
| Co-sited | Centre | 0.0 | 0.5 |
| Centre | Centre | 0.5 | 0.5 |

In the present embodiments, where the sampling of the texture would, in effect, require texel values from texels that lie outside the edge of the defined texture (e.g. such as may be the case when sampling at or near to the edge of the texture), the luma value for a position that will be outside the texture is clamped to the closest luma value that is defined for the texture in the appropriate direction (and correspondingly for the chroma value).

Once the interpolation weights for the determined sets of chroma and luma data elements (the four chroma and luma data element values around the sample position 5 in question) have been determined, they are used to weight the chroma and luma data element values, respectively, around the sample position 5 in question in order to determine texture data (i.e. weighted sums of the texture data values around the sample position 5 in question) for the sample position 5 in question.

As shown in FIG. 6, once the texture filtering unit 18 has determined the chroma and luma values for the sample position in question, those chroma and luma values are returned to the shader core 12 for use in generating the render target (e.g. shading the fragment in question), for output to the render target 13.

The above primarily describes the arrangement of the present embodiment when operating in a non-replicated chroma value mode and using bilinear filtering for determining the texture values to use.

As discussed above, it would also be possible to operate the technology described herein in a "replicated" chroma mode in which the chroma value is replicated to correspond to the number of distinct luma values that are present in a macrotexel. In such an arrangement, the chroma value could be replicated either when writing the texture data into the texture cache (in which case the process would convert the data stored in memory to YUV444 during fetching of the cache line from memory) or when reading the texture data out from the texture cache (in this case the data is stored in the cache as macrotexels in the same manner as for all the other chroma siting modes).

In the replicated chroma case, after read-out from the cache, in the present embodiments the luma weights are tweaked such that the output becomes exactly the same as it would as if the chroma values have been replicated in the cache. In effect, one of the chroma samples is given a weight of 1.0 within the area between the corresponding luma samples. Where a sample is being taken between macrotexels, the respective chroma values for those macrotexels will be interpolated.

Exemplary pseudocode for performing this weight tweaking showing the complete chroma calculation (i.e. for both replicated and non-replicated chroma values) is shown below.

```
// Compute the weights for chroma
frac_u_chr = frac( texel_u )
frac_v_chr = frac( texel_v )
// Special-case weights for chroma-replicated
if ( yuv_chroma_siting == replicated )
{
    frac_u_chr = max( min( frac_u_chr*2 - 0.5, 1.0 ), 0.0 )
    frac_v_chr = max( min( frac_v_chr*2 - 0.5, 1.0 ), 0.0 )
}
frac_u_chr_inv = 1.0 - frac_u_chr
frac_v_chr_inv = 1.0 - frac_v_chr
if ( filter_mode == LINEAR )
{
    w_chr_00 = frac_u_chr_inv*frac_v_chr_inv
    w_chr_01 = frac_u_chr*frac_v_chr_inv
    w_chr_10 = frac_u_chr_inv*frac_v_chr
    w_chr_11 = frac_u_chr*frac_v_chr
}
else if ( filter_mode == NEAREST )
{
    w_chr_00 = 1
    w_chr_01 = 0
    w_chr_10 = 0
    w_chr_11 = 0
}
```

This weight adjusting process is performed at the beginning of the weight-calculation process.

This pseudocode also shows a selection between bilinear interpolation (LINEAR), and an alternative "nearest" sampling mode (NEAREST), in which only one macrotexel is read from the cache (the top left one) and the chroma value of that one is used for the whole area covered by the macrotexel without any interpolation (from adjacent macrotexels) taking place. The luma values are similarly treated without interpolation. In the case of this "nearest" (point-sampling) filtering mode, the texel index determinations (discussed above) corresponding to a texel position to be sampled are determined as:

$$macrotexel\_index\_x = \mathrm{floor}(sample\_position\_x * macrotexel\_horizontal\_count) \quad (27)$$

and $$macrotexel\_index\_y = \mathrm{floor}(sample\_position\_y * macrotexel\_vertical\_count) \quad (28)$$

It can be seen from the above that the technology described herein, in its embodiments at least, can provide a more efficient mechanism for using YUV textures in a graphics processing system and unit. This is achieved, in the embodiments of the technology described herein at least, by storing chrominance and luminance data values for associated positions in a YUV texture together in groups in the texture cache, and then retrieving that data from the texture cache using positions within the texture to be sampled (as compared, for example, to addressing the cache using memory addresses).

The foregoing detailed description has been presented for the purposes of illustration and description. It is not intended to be exhaustive or to limit the technology to the precise form disclosed. Many modifications and variations are possible in light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a graphics processing system in which data of a texture to be used when rendering a render output is loaded from memory into a cache for use by the graphics processing system when rendering the render output, the method comprising:
when using a graphics texture that is stored in memory as YUV texture data comprising luminance and chrominance texture data:
storing YUV texture data for the texture in a cache from which that texture data is to be read by the graphics processing system when generating a render output such that the data values for a chrominance data element and the associated set of one or more luminance data elements of the texture are stored together as a group in the cache; and
storing in association with the cache an identifier for the data values of the chrominance data element and its associated set of one or more luminance data elements, the identifier being useable to identify the chrominance data element and its associated set of one or more luminance data elements in the cache, and being indicative of a position in the graphics texture;
wherein the cache comprises a plurality of cache lines and a plurality of groups of YUV texture data are stored in a cache line, the plurality of groups of texture data stored in a cache line comprising a set of adjacent chroma data element positions of the texture and their corresponding luma data element positions.

2. A method as claimed in claim 1, wherein:
when the chrominance and luminance data are provided at the same resolution, each group of YUV texture data contains one chrominance data value and one luminance data value;
when the chrominance data is provided at half the resolution of the luminance data horizontally but at the same resolution as the luminance data vertically, each group of YUV texture data contains one chroma data value and two luma data values; and
when the chroma data is stored at half the resolution of the luma data both horizontally and vertically, each group contains one chroma data value and four luma data values.

3. A method as claimed in claim 1, wherein the identifier is indicative of the position of a chrominance data element in the graphics texture.

4. A method as claimed in claim 1, wherein a single identifier is provided and used in common for more than one group of texture data comprising a chrominance data element and its associated set of one or more luminance data elements.

5. A method as claimed in claim 1, wherein:
the YUV texture data is stored in memory as a data array storing luminance data of the texture, and one or more other data arrays storing chrominance data of the texture;
and the method comprises:
reading a chrominance data value or values for a chrominance data element from the one or more other data arrays in which the chrominance data of the YUV texture is stored in the memory;
reading one or more luminance data values for a set of luminance data elements associated with the chrominance data element whose value has been read, from the data array in which the luminance data of the YUV texture is stored in the memory; and
storing the read chrominance data value or values and luminance data values in the cache such that the data values for the chrominance data element and the associated set of one or more luminance data elements are stored together as a group in the cache.

6. A method as claimed in claim 1, wherein a cache line of the cache is only indicated as being valid once the cache line is full of valid YUV texture data.

7. A method as claimed in claim 1, further comprising reading YUV texture data from the cache by addressing the cache using the position in the YUV texture for which texture data is to be sampled, and using the indicated sampling position and the identifiers for the groups of YUV texture data stored in the cache to identify the required texture data in the cache.

8. A method as claimed in claim 1, wherein:
texture data required from the cache is indicated with a sample position in the YUV texture; and
the method comprises:
converting that sample position to a position of a chrominance data element in the YUV texture that corresponds to the required sampling position;
wherein converting the sample position to a position of a chrominance data element in the YUV texture takes account of a relative position of the chrominance data element to its set of one or more associated luminance data elements.

9. A method as claimed in claim 1, further comprising:
selecting a subset of luminance data values from the luminance data values for plural groups of texture data comprising a chrominance data value and its associated luminance data values read from the cache for a texture position being sampled; and interpolating the luminance data value for the texture position being sampled using the selected subset of luminance data values.

10. A method of operating a graphics processing system in which data of a texture to be used when rendering a render output is loaded from memory into a cache for use by the graphics processing system when rendering the render output, the method comprising:
when using a graphics texture that is stored in memory as YUV texture data, the YUV texture data comprising a data array storing luminance data of the texture, and one or more other data arrays storing chrominance data of the texture:
reading a chrominance data value or values for a chrominance data element from the one or more other data arrays in which the chrominance data of the YUV texture is stored in the memory;
reading one or more luminance data values for a set of luminance data elements associated with the chrominance data element whose value has been read, from the data array in which the luminance data of the YUV texture is stored in the memory; and
storing the read chrominance data value or values and luminance data values in the cache such that the data values for the chrominance data element and the associated set of one or more luminance data elements are stored together as a group in the cache;
wherein the cache comprises a plurality of cache lines and a plurality of groups of YUV texture data are stored in a cache line, the plurality of groups of texture data stored in a cache line comprising a set of adjacent chroma data element positions of the texture and their corresponding luma data element positions.

11. A graphics processing system comprising:
a memory;
a graphics processing unit; and
a cache; and
in which data of a texture to be used when rendering a render output is loaded from the memory into the cache for use by the graphics processing unit when rendering the render output;
the graphics processing system further comprising:
processing circuitry operable to, when using a graphics texture that is stored in the memory as YUV texture data comprising luminance and chrominance texture data:
store the YUV texture data for the texture in the cache such that the data values for a chrominance data element and the associated set of one or more luminance data elements of the texture are stored together as a group in the cache; and
store in association with the cache an identifier for the data values of the chrominance data element and its associated set of one or more luminance data elements, the identifier being useable to identify the chrominance data element and its associated set of one or more luminance data elements in the cache, and being indicative of a position in the graphics texture;
wherein the cache comprises a plurality of cache lines and a plurality of groups of YUV texture data are stored in a cache line, the plurality of groups of texture data stored in a cache line comprising a set of adjacent chroma data element positions of the texture and their corresponding luma data element positions.

12. The system as claimed in claim 11, wherein:
when the chrominance and luminance data are provided at the same resolution, each group of YUV texture data contains one chrominance data value and one luminance data value;
when the chrominance data is provided at half the resolution of the luminance data horizontally but at the same resolution as the luminance data vertically, each group of YUV texture data contains one chroma data value and two luma data values; and
when the chroma data is stored at half the resolution of the luma data both horizontally and vertically, each group contains one chroma data value and four luma data values.

13. The system as claimed in claim 11, wherein the identifier is indicative of the position of a chrominance data element in the graphics texture.

14. The system as claimed in claim 11, wherein a single identifier is provided and used in common for more than one group of texture data comprising a chrominance data element and its associated set of one or more luminance data elements.

15. The system as claimed in claim 11, wherein:
processing circuitry is operable to, when using a graphics texture that is stored in memory as YUV texture data, the YUV texture data comprising a data array storing luminance data of the texture, and one or more other data arrays storing chrominance data of the texture:
read a chrominance data value or values for a chrominance data element from the one or more other data arrays in which the chrominance data of the YUV texture is stored in the memory;
read one or more luminance data values for a set of luminance data elements associated with the chrominance data element whose value has been read, from the data array in which the luminance data of the YUV texture is stored in the memory; and
store the read chrominance data value or values and luminance data values in the cache such that the data values for the chrominance data element and the associated set of one or more luminance data elements are stored together in the cache.

16. The system as claimed in claim 11, wherein a cache line of the cache is only indicated as being valid once the cache line is full of valid YUV texture data.

17. The system as claimed in claim 11, further comprising processing circuitry operable to read YUV texture data from the cache by addressing the cache using a position in the YUV texture for which texture data is to be sampled, and using the indicated sampling position and the identifiers for the groups of YUV texture data stored in the cache to identify the required texture data in the cache.

18. The system as claimed in claim 11, wherein:
texture data required from the cache is indicated with a sample position in the YUV texture; and
the system comprises:
processing circuitry operable to convert that sample position to a position of a chrominance data element in the YUV texture that corresponds to the required sampling position;
wherein converting the sample position to a position of a chrominance data element in the YUV texture takes account of a relative position of the chrominance data element to its set of one or more associated luminance data elements.

19. The system as claimed in claim 11, further comprising processing circuitry operable to:

select a subset of luminance data values from the luminance data values for plural groups of texture data comprising a chrominance data value and its associated luminance data values read from the cache for a texture position being sampled; and interpolate the luminance data value for the texture position being sampled using the selected subset of luminance data values.

20. A graphics processing system comprising:
a memory;
a graphics processing unit; and
a cache; and
in which data of a texture to be used when rendering a render output is loaded from the memory into the cache for use by the graphics processing unit when rendering the render output;
the graphics processing system further comprising:
processing circuitry operable to, when using a graphics texture that is stored in memory as YUV texture data, the YUV texture data comprising a data array storing luminance data of the texture, and one or more other data arrays storing chrominance data of the texture:
read a chrominance data value or values for a chrominance data element from the one or more other data arrays in which the chrominance data of the YUV texture is stored in the memory;
read one or more luminance data values for a set of luminance data elements associated with the chrominance data element whose value has been read, from the data array in which the luminance data of the YUV texture is stored in the memory; and
store the read chrominance data value or values and luminance data values in the cache such that the data values for the chrominance data element and the associated set of one or more luminance data elements are stored together in the cache;
wherein the cache comprises a plurality of cache lines and a plurality of groups of YUV texture data are stored in a cache line, the plurality of groups of texture data stored in a cache line comprising a set of adjacent chroma data element positions of the texture and their corresponding luma data element positions.

21. A non-transitory computer readable storage medium storing computer software code which when executing on a processor performs a method of operating a graphics processing system in which data of a texture to be used when rendering a render output is loaded from memory into a cache for use by the graphics processing system when rendering the render output, the method comprising:
when using a graphics texture that is stored in memory as YUV texture data comprising luminance and chrominance texture data:
storing YUV texture data for the texture in a cache from which that texture data is to be read by the graphics processing system when generating a render output such that the data values for a chrominance data element and the associated set of one or more luminance data elements of the texture are stored together as a group in the cache; and
storing in association with the cache an identifier for the data values of the chrominance data element and its associated set of one or more luminance data elements, the identifier being useable to identify the chrominance data element and its associated set of one or more luminance data elements in the cache, and being indicative of a position in the graphics texture;
wherein the cache comprises a plurality of cache lines and a plurality of groups of YUV texture data are stored in a cache line, the plurality of groups of texture data stored in a cache line comprising a set of adjacent chroma data element positions of the texture and their corresponding luma data element positions.

* * * * *